(12) United States Patent
Winlow et al.

(10) Patent No.: US 7,633,586 B2
(45) Date of Patent: Dec. 15, 2009

(54) DISPLAY

(75) Inventors: Robert Winlow, Oxford (GB); Zabbie J. Acosta, Devon (GB); Martin D. Tillin, Oxfordshire (GB); Paul Bonnett, Oxford (GB); Diana U. Kean, Oxfordshire (GB); Grant Bourhill, Stow-on-the-Wold (GB); Michel Sagardoyburu, Angais (FR); Emma Jayne Walton, Oxford (GB); Koji Yabuta, Nara (JP); Hiroshi Fukushima, Yamatokoriyama (JP); Tomoo Takatani, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 633 days.

(21) Appl. No.: 11/109,364

(22) Filed: Apr. 19, 2005

(65) Prior Publication Data

US 2005/0243265 A1 Nov. 3, 2005

(30) Foreign Application Priority Data

Apr. 20, 2004 (GB) ................................. 0408742.5

(51) Int. Cl.
*G02F 1/1337* (2006.01)
(52) U.S. Cl. ....................... 349/123; 349/124; 349/125; 349/126; 349/127; 349/128; 349/129; 349/130; 349/74; 349/75; 349/76; 349/77; 349/78; 349/79; 349/80; 349/81; 349/82; 349/83
(58) Field of Classification Search ................. 349/178, 349/123–130, 65, 68, 74
See application file for complete search history.

(56) References Cited

U.S. PATENT DOCUMENTS

2005/0190329 A1* 9/2005 Okumura .................... 349/123

FOREIGN PATENT DOCUMENTS

EP 1 116 990 A2 7/2001

(Continued)

OTHER PUBLICATIONS

European Search Report for corresponding Application No. 05103193.8 dated Nov. 30, 2005.

(Continued)

*Primary Examiner*—David Nelms
*Assistant Examiner*—Thanh-Nhan P Nguyen
(74) *Attorney, Agent, or Firm*—Renner, Otto, Boisselle & Sklar, LLP

(57) ABSTRACT

A display is provided for switching between a narrow or private viewing mode and a wide or public viewing mode. The display comprises a display device which is controlled to provide display of a desired image or sequence of images. This is associated with a liquid crystal device having at least one liquid crystal layer whose molecules are switchable between a first state providing a first angular viewing range and a second state providing a second angular viewing range which is within and smaller than the first angular viewing range. With the molecules in the second state, the device at least partially blocks light propagating towards part of the first angular viewing range outside the second angular viewing range. The or each liquid crystal layer is in contact with at least one alignment surface, the or each of which comprises a uniform non-patterned alignment surface.

52 Claims, 32 Drawing Sheets

FOREIGN PATENT DOCUMENTS

| | | |
|---|---|---|
| EP | 1 475 655 A1 | 11/2004 |
| JP | 11-007045 | 1/1999 |
| JP | 2003-015535 | 1/2003 |
| JP | 2003-233074 | 8/2003 |

OTHER PUBLICATIONS

Chinese Office Action for corresponding Application No. 200510078811.4 dated Sep. 7, 2007 (English translation provided).

* cited by examiner

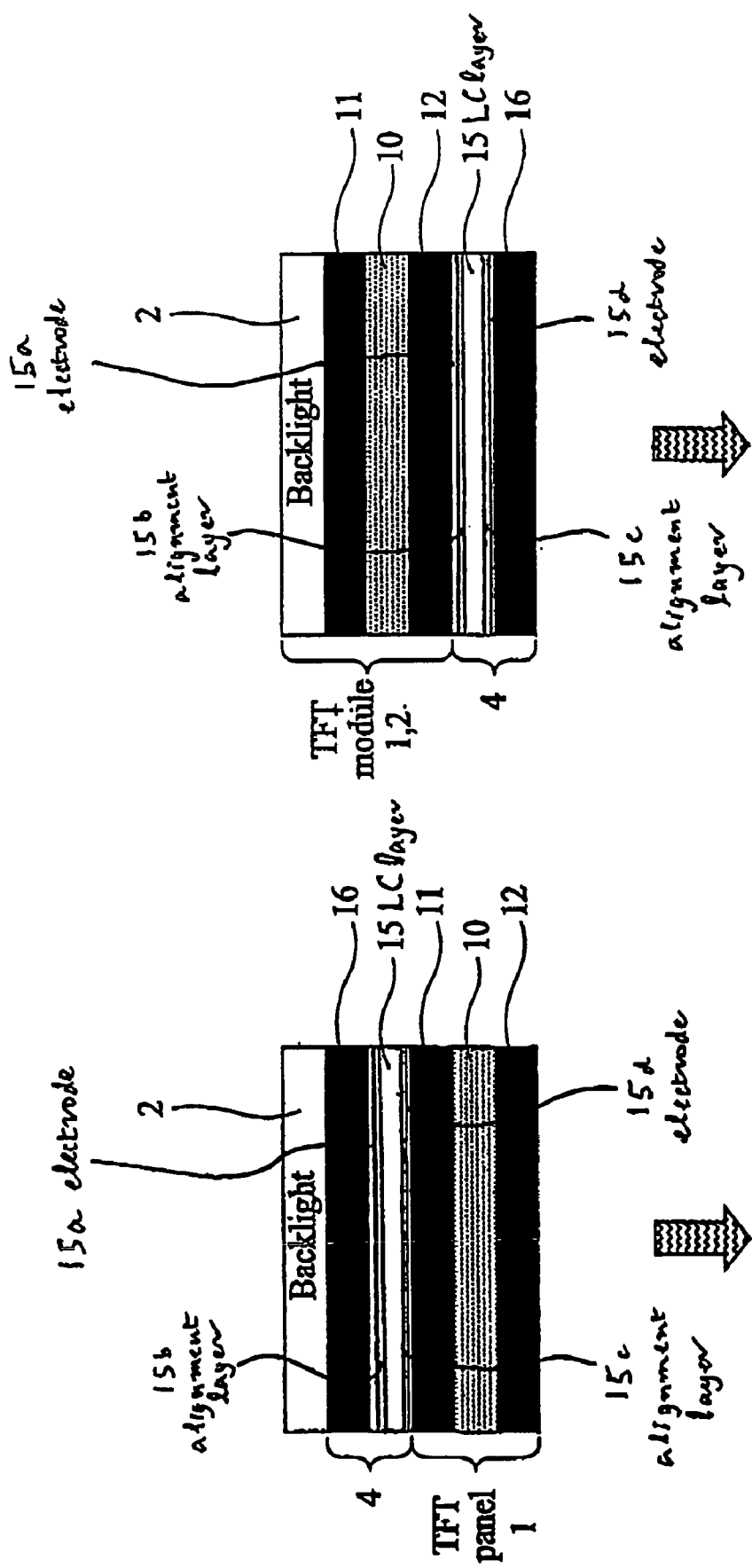

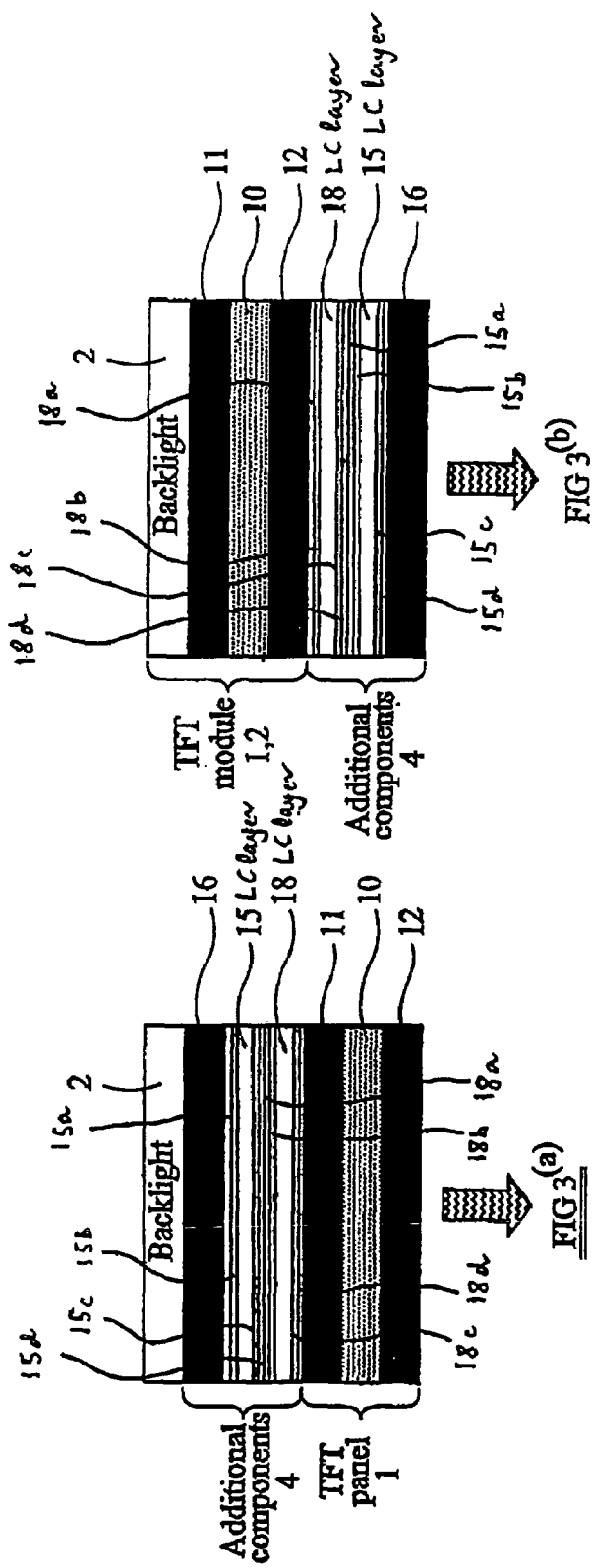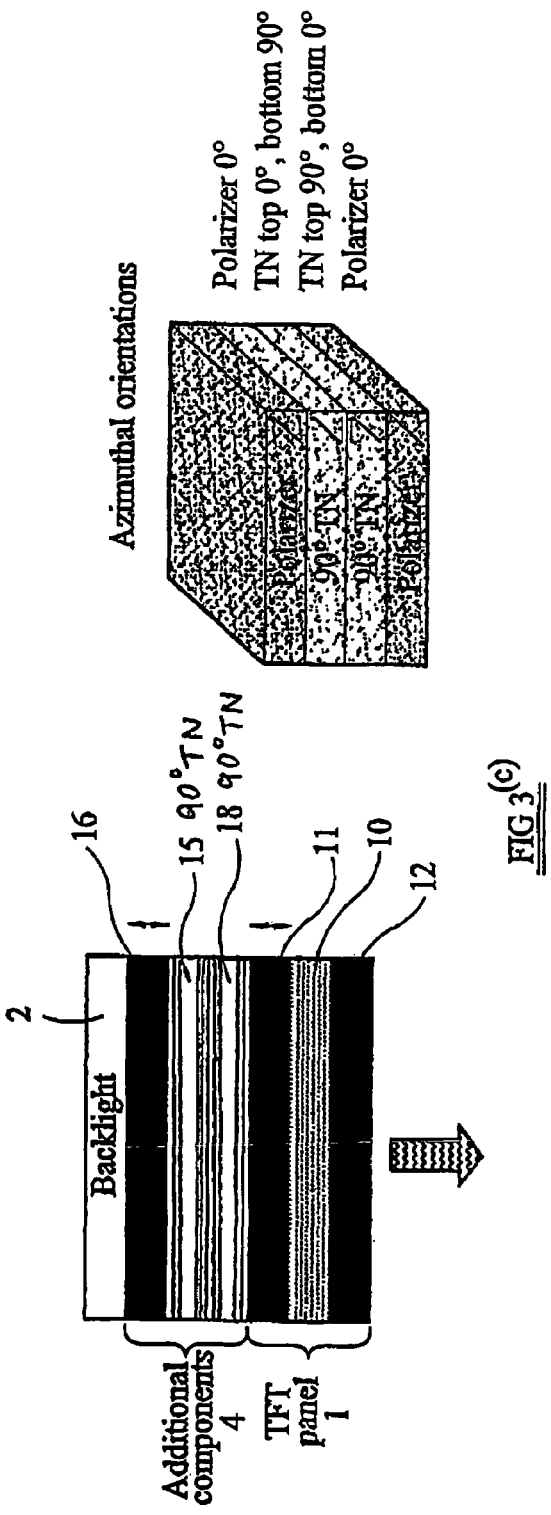

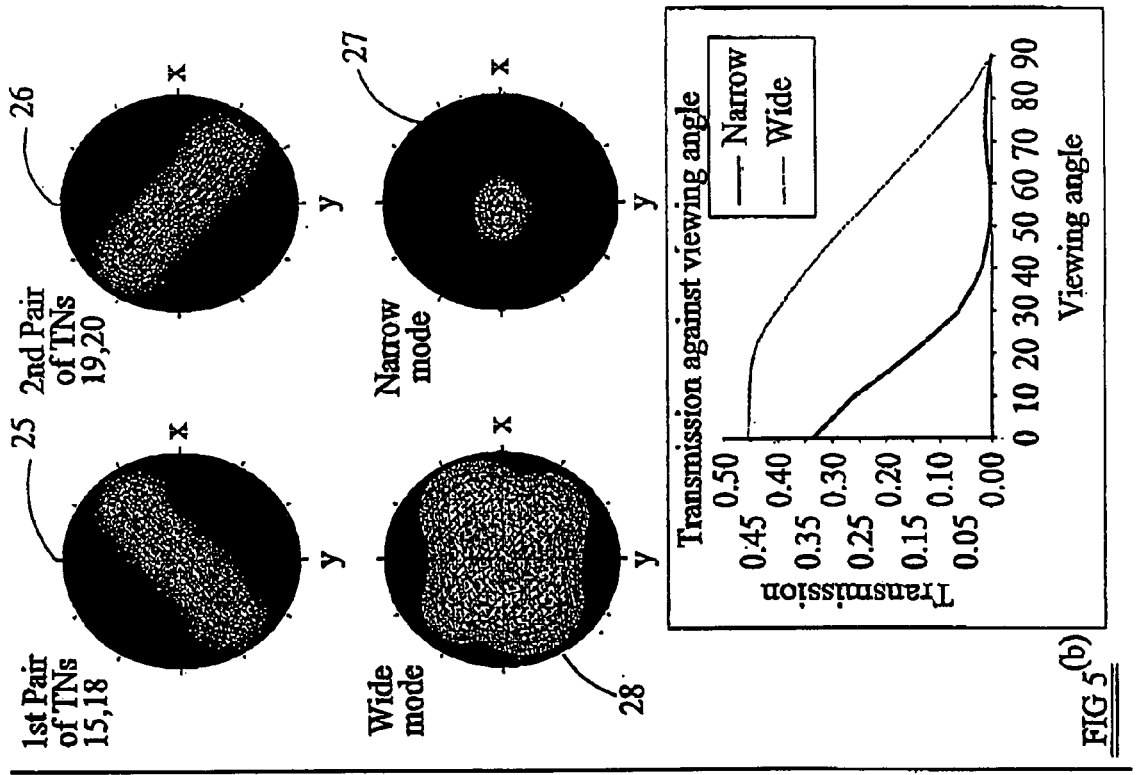
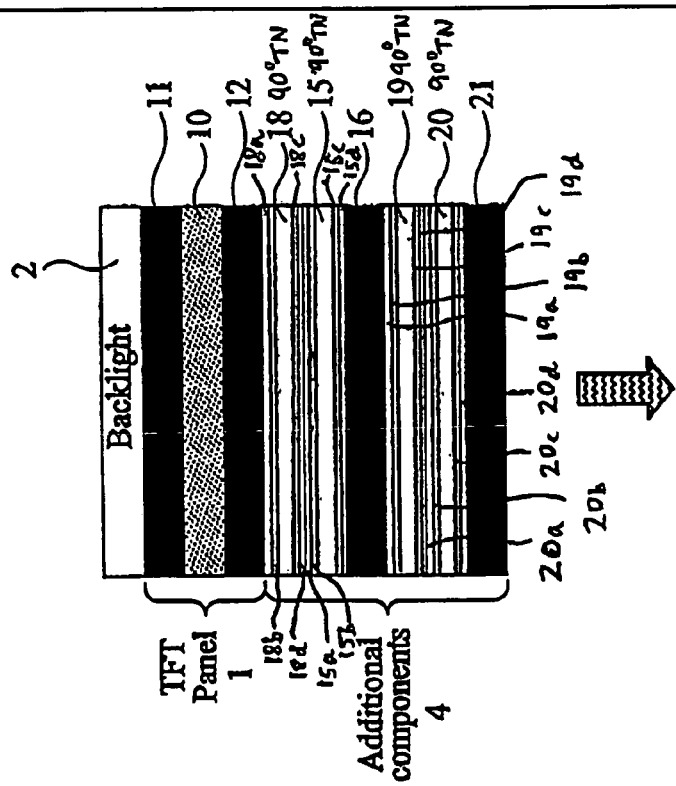
FIG 5(b)
FIG 5(a)

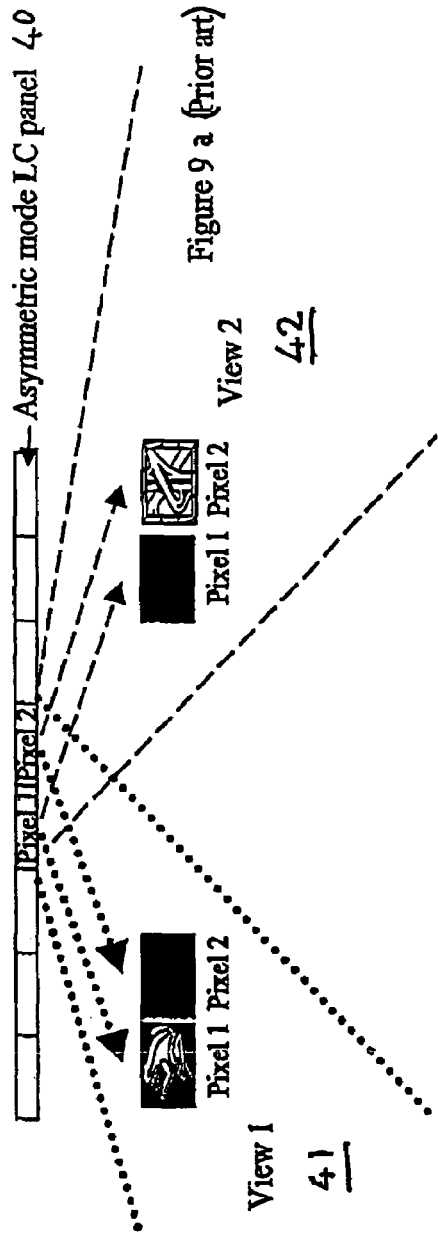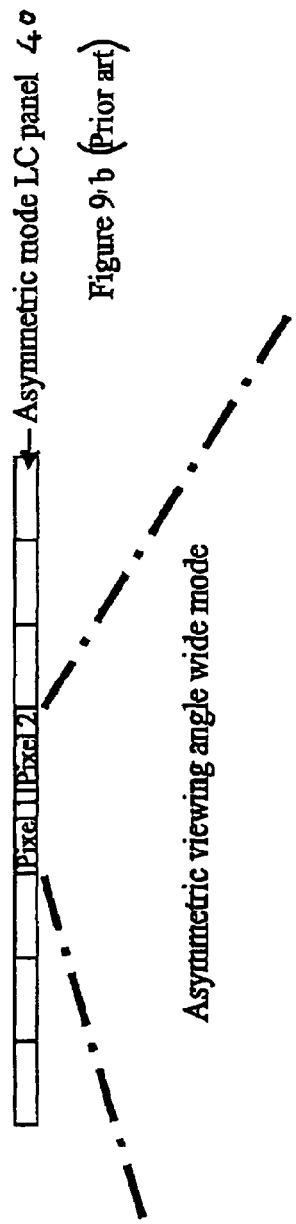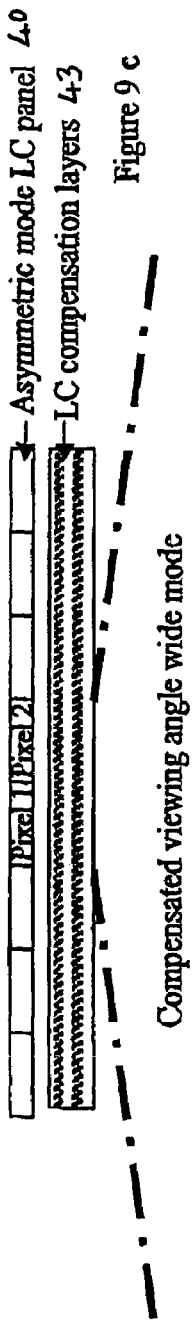

Narrow mode

Wide mode

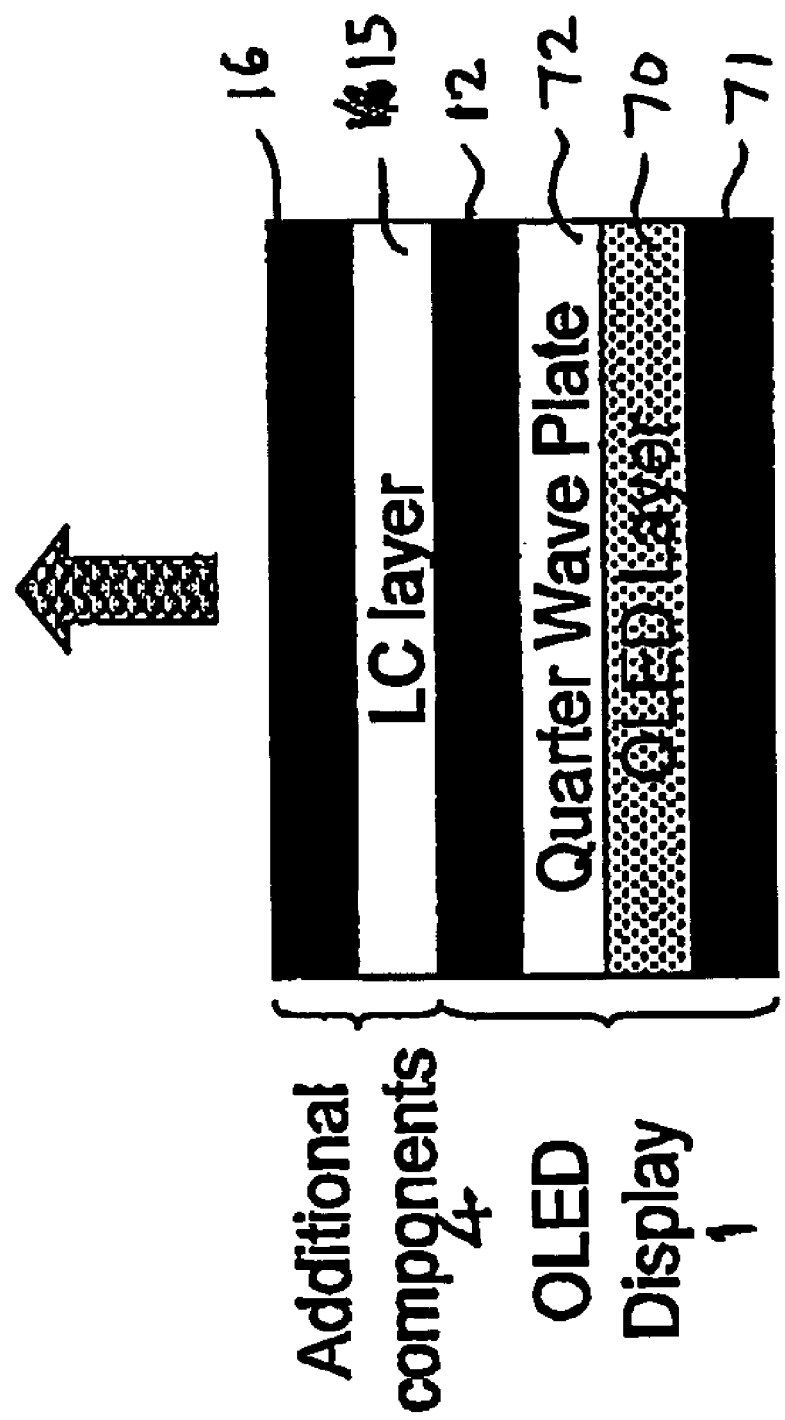

DISPLAY

TECHNICAL FIELD

The present invention relates to a display.

BACKGROUND

Electronic display devices, such as monitors used with computers and screens built in to telephones and portable information devices, are usually designed to have a viewing angle as wide as possible so that they can be read from any viewing position. However, there are some situations where a display which is visible from only a narrow range of angles is useful. For example, one might wish to read a private document using a portable computer while on a crowded train.

A number of devices are known which restrict the range of angles or positions from which a display can be viewed U.S. Pat. No. 6,552,850 discloses a technique for the display of private information on a cash-dispensing machine. Light emitted by the machine display has a fixed polarisation state and the machine and its user are surrounded by a large screen of sheet polariser which absorbs light of that polarisation state but transmits the orthogonal state. Passers by can see the user and the machine but cannot see information displayed on the screen.

Another known technique for controlling the d on of light is a 'louvred' film. The film consists of alternating transparent and opaque layers in an arrangement similar to a Venetian blind. Like a Venetian blind, it allows light to pass through it when the light is travelling in a direction nearly parallel to the layers but absorbs light travelling at large angles to the plane of the layers. These layers may be perpendicular to the surface of the film or at some other angle.

Louvred films may be manufactured by stacking many alternating sheets of transparent and opaque material and then cutting slices of the resulting block perpendicular to the layers. This method has been-known for many years. For example, it is disclosed in U.S. Pat. No. 2,053,173, U.S. Pat. No. 2,689,387 and U.S. Pat. No. 3,031,351.

A process where a louvred film is cut continuously from a cylindrical billet of stacked layers is disclosed in U.S. RE27617. U.S. Pat. No. 4,766,023 shows how the optical quality and mechanical robustness of the resulting film can be improved by coating with a UV-curable monomer and then exposing the film to UV radiation. U.S. Pat. No. 4,764,410 discloses a similar process where the UV-curable material is used to bond the louvre sheet to a covering film.

Other methods exist for making films with similar properties to the louvred film. For example, U.S. Ser. No. 05/147,716 discloses a light-control film which contains many elongate particles which are aligned in the direction perpendicular to the plane of the film. Light rays which make large angles to this direction are therefore strongly absorbed.

Another example of a light-control film is disclosed in U.S. Ser. No. 05/528,319. Embedded in the transparent body of the film are two or more layers parallel to the plane of the film, each layer having opaque and transparent sections. The opaque sections block the transmission of light through the film in certain directions while allowing the transmission of light in other directions.

The films described above may be placed either in front of a display panel or between a transmissive display panel and its backlight to restrict the range of angles from which the display can be viewed. In other words, they make a display 'private'. However none of them can easily be switched off to allow viewing from a wide range of angles.

U.S. 2002/0158967 shows how a light control film can be mounted on a display so that the light control film can be moved over the front of the display to give a private mode or mechanically retracted into a holder behind or beside the display to give a public mode. This method has the disadvantages that it contains moving parts which may fail or be damaged and which add bulk to the display.

Another known technique for switching between public and private mode with no moving parts is to mount a light control film behind a display panel and to place a diffuser which can be electronically switched on and off between the light control film and the panel. When the diffuser is inactive, the light control film restricts the range of viewing angles and the display is in private mode. When the diffuser is switched on, it causes light travelling at a wide range of angles to pass through the panel and the display is in public mode. It is also possible to mount the light control film in front of the panel and place the switchable diffuser in front of the light control film to achieve the same effect. Switchable privacy devices of such type are described in U.S. Pat. No. 5,831,698, U.S. Pat. No. 6,211,930 and U.S. Ser. No. 05/877,829. They share the disadvantage that the light control film always absorbs a significant fraction of the light incident upon it, whether the display is in public or private mode. The display is therefore inefficient in its use of light. Since the diffuser spreads light through a wide range of angles in the public mode, these displays are also dimmer in public than in private mode unless the backlight is made brighter to compensate.

A third known technique for providing a switchable public/private display is disclosed in U.S. Pat. No. 5,825,436. The light control device in this patent is similar in structure to the louvred film described earlier. However, each opaque element in the louvred film is replaced by a liquid crystal cell which can be electronically switched from an opaque state to a parent state. The light control device is placed in front of or behind a display panel. When the cells are opaque, the display is in its private mode; when the cells are transparent, the display is in its public mode.

A first disadvantage of this method is difficulty and expense of manufacturing liquid crystal cells with an appropriate shape. A second disadvantage is that in the private mode, a ray of light may enter at an angle such that it passes first through the transparent material and then through part of a liquid crystal cell. Such a ray will not be completely absorbed by the liquid crystal cell and this may reduce the privacy of the device.

JP2003-233074 and JP2003-28263 disclose a liquid crystal display which provides a conventional display of images from normal viewing angles. However, for relatively large viewing angles away from the normal to the display, a fixed image is displayed and this may be used to hide or "scramble" the normal image 80 as to provide a privacy mode of operation. The fixed image is achieved by having display regions with different alignment directions from each other, although all pixels operate in the same mode. A lower than normal drive voltage is used.

Although such an arrangement may be used to provide a privacy mode, it is not switchable. In particular, the relatively narrow range of viewing angles throughout which the non-fixed image can be seen cannot be changed if non-private operation is desired.

Although U.S. Pat. No. 6,445,434 is mainly concerned with a single panel non-switched private display of the type disclosed in JP2003-233074 and JP2003-28263, it does disclose a dual panel display which is switchable between public and private modes. A conventional liquid crystal display for displaying images is disposed behind a liquid crystal device which has a patterned alignment layer and which is switchable to provide the public and private modes. In the public mode, the device has little effect on the viewing angle provided by the display. In the private mode, the patterning of the alignment layer is made visible at viewing angles away from the normal to the display to provide a "confusing" or "obscuring" pattern intended to make the displayed image unintelligible from such viewing angles.

SUMMARY

According to a first aspect of the invention, there is provided a display comprising a display device which is controllable to provide image display and a first liquid crystal device having at least one liquid crystal layer whose molecules are switchable between a first state providing a first viewing angle range and a second state providing a second angle viewing range which is within and smaller than the first viewing angle range, the first liquid crystal device being arranged, when the liquid crystal molecules are in the second state, to block at least partially light propagating towards part of the first viewing angle range outside the second viewing angle range, the or each liquid crystal layer being in contact with at least one alignment surface, characterised in that the or each alignment surface of the or each liquid crystal layer comprises a uniform non-patterned alignment surface.

The first liquid crystal device may comprise at least one linear polariser. The or each liquid crystal layer may comprise nematic liquid crystal. The or each liquid crystal layer may be arranged to operate in one of untwisted nematic, twisted nematic, supertwisted nematic, vertically aligned nematic, twisted vertically aligned nematic and hybrid aligned nematic modes.

The or each liquid crystal layer may be bistable. The or each liquid crystal layer may be a bistable twisted nematic or zenithal bistable nematic layer.

The first liquid crystal device may comprise a plurality of liquid crystal layers arranged to operate in the same mode. The display may comprise first and second twisted nematic liquid crystal layers of opposite twist directions disposed between first and second linear polarisers. The display may comprise third and fourth twisted nematic liquid crystal layers of opposite twist directions disposed between the second and a third linear polarisers.

The display may comprise first, second and third linear polarisers and first and second vertically aligned nematic liquid crystal layers, the first layer being disposed between the first and second polarisers, the second polariser having a polarising direction perpendicular to those of the first and third polarisers, and the first and second states being a pinwheel state and a substantially uniform non-twisted state, respectively.

The at least one liquid crystal layer may comprise a vertically aligned nematic liquid crystal layer disposed between first and second polarisers and having a liquid crystal director direction, when switched, whose azimuth is substantially parallel or perpendicular to transmission axes of the first and second polarisers.

The at least one liquid crystal layer may comprise a non-twisted nematic layer disposed between first and second polarisers and having an alignment direction whose azimuth is substantially parallel to transmission axes of the first and second polarisers.

The first liquid crystal device may comprise a fixed C plate retarder and the at least one liquid crystal layer may comprise a switchable C plate retarder which is switchable between a first state, in which the optical effect of the fixed retarder is substantially nullified, and a second different state. The switchable C plate retarder may have substantially no optical effect in the second state. The fixed retarder may be a positive C plate retarder. The at least one liquid crystal layer may be a cholesteric liquid crystal layer.

The first liquid crystal device may be arranged, when the liquid crystal molecules are in the second state, substantially to block all light propagating towards the part of the first viewing angle range.

The first liquid crystal device may comprise at least one electrode, the or each of which is uniform and non-patterned.

The first liquid crystal device may be arranged, when the liquid crystal molecules are in the second state, to superpose, on light propagating towards the part of the first viewing angle range, a spatially varying amplitude constituting and obscuring pattern for rendering substantially unintelligible an image display by the display device. The first liquid crystal device may comprise at least one electrode which is patterned with a first pattern. The at least one electrode may be patterned to define first and second regions of the at least one liquid crystal layer for providing first and second attenuations, respectively, of light travel into the part of the first viewing range when the molecules are in the second state. The first and second attenuations may be minimum and maximum attenuations respectively. The second regions may be inactive and may be separated from the first regions by a minimal insulating gap.

The first pattern may be a pattern representing text.

The first pattern maybe a chequerboard pattern.

The first pattern may be a pattern forming an optical illusion.

The first liquid crystal device may comprise a further electrode which is patterned with a second pattern different from the first pattern. The first and second patterns may have different feature sizes.

The at least one patterned electrode may comprise an addressable matrix for permitting selection of the obscuring pattern The display may comprise an electrode driving arrangement for producing a time-varying obscuring pattern.

The electrode may be arranged to apply a voltage to the at least one liquid crystal layer which varies from the centre to the edges of the at least one liquid crystal layer so as to compensate for the effects of off-normal viewing of the edges.

When the molecules are in the second state, the first and second regions may have substantially the some function of transmission against angle with respect to the normal to the display for angles within the second viewing angle range and different functions for angles inside the first viewing angle range and outside the second viewing angle range. When the molecules are in the second state, the electrodes defining the first and second regions may be arranged to receive different voltages. The display may comprise a compensating layer co-operating with the at least one liquid crystal layer to provide the same function. The compensating layer may be arranged to be substantially disabled when the molecules are in the first state. The compensating layer may comprise liquid crystal.

The at least one liquid crystal layer may comprise a surface mode layer and the compensating layer may comprise a surface region of the surface mode layer.

According to a second aspect of the invention, there is provided a display comprising a liquid crystal device which is controllable to provide image display and a first liquid crystal device having at least one liquid crystal layer whose molecules are switchable between a first state providing a first viewing angle range and a second state providing a second viewing angle range which is within and smaller than the first viewing angle range, the first liquid crystal device being arranged, when the liquid crystal molecules are in the second state, to block partially light propagating towards parts of the first viewing angle range outside the second viewing angle range, the at least one liquid crystal layer being in contact with at least one patterned alignment surface having first and second regions of different alignment directions, characterised in that the at least one liquid crystal layer comprises one of an electronically controlled birefringence cell and a vertically aligned nematic liquid crystal layer.

The alignment directions may be substantially perpendicular to each other and the parts of the first viewing angle range may be substantially eqi-angularly spaced in azimuth around a normal to the display.

The first liquid crystal device may be detachable from and attachable to the display device to permit operation of the display without the first liquid crystal device.

The second viewing angle range may include the normal to the display.

The second viewing angle range may have a bisector which is non-normal to the display.

The second viewing angle range may comprise first and second sub-ranges disposed at different zenithal angles with respect to the display.

The second viewing angle range may be substantially rotationally symmetrical.

The display may be arranged to display an indication when the molecules are in the second state. The display may be arranged to display the indication in response to the content of data for display.

The display device may be transmissive. The first liquid crystal device may be disposed between the display device and the backlight.

The display device may be reflective.

The display device may be transflective.

The display device may comprise a second liquid crystal device.

The display device may be light-emissive. The display device may be at organic light emitting device. The display may comprise a circular polariser between the display device and the liquid crystal device. The display device may be arranged to emit linearly polarised light.

The first liquid crystal device may be disposed in front of the display device.

The display may comprise an ambient light sensor for causing the display to provide the second viewing angle range when the ambient light is below a threshold.

The display may comprise a vehicle display.

It is thus possible to provide a display whose viewing angle may be switched, for example between a wide view mode and a narrow or private view mode. The first liquid crystal device may be used with a display device which can be of any suitable type and whose operation need not be changed in order to provide the wide and narrow view modes.

Such a display may be used, for example, in desktop monitors, mobile telephones, personal digital assistants (PDA's), mobile televisions, mobile DVD (digital versatile disc) players/recorders, end point sales (EPOS) terminals and cash ATMs (automatic teller machines). Such an arrangement is simple to implement and may be manufactured by well-known and established manufacturing techniques. In some embodiments, the first liquid crystal device does not require any electrode patterning or internal structure, for example to define pixels. If the flat liquid crystal device has a single liquid crystal region for switching the viewing angle range across the whole of the display device, a very simple electrode pattern may be used and is easy to manufacture. Although the display may be switched between the first and second viewing angle ranges, the viewing angle may be varied continuously or in steps by, for example, applying the appropriate drive voltages to the first liquid crystal device.

Such displays may be used in applications requiring a "public" mode with a wide viewing angle for general use and a "private" mode with a narrow viewing angle so that, for example, private information may be read in public places.

Another application for such a display is in a vehicle dashboard. For example, the viewing angle of the display may be controlled so that a passenger or a driver is unable to view the display. Alternatively, the viewing angle may be controlled in order to reduce reflection of the display in windscreens and windows, especially at night time or in low light conditions. In order to provide automatic control, for example, a brightness sensor and a backlight brightness control may be provided.

In yet another application, the first liquid crystal device acts as a switchable compensation film. Liquid crystal displays are usually laminated with static compensation films to improve the viewing angle characteristics. Such known arrangements are generally arranged to give the best results in one direction, usually horizontally. For a display which can be rotated and viewed in landscape or portrait modes, it is advantageous to be able to switch a compensation film so as to give improved results depending on the display content.

Such displays may also be used in applications where two or more images are spatially multiplexed and displayed by the display device. For example, such a display may have a first mode in which one image is displayed across the display and a second mode in which two or more different images are displayed across the display in a spatially multiplexed manner. The different modes may require different optical compensation and a switchable compensator may be used to achieve this.

BRIEF DESCRIPTION OF THE DRAWINGS

FIGS. 2a and 2b are diagrammatic cross-sectional views of displays constituting embodiments of the invention and having a single additional liquid crystal layer as compared with a conventional display;

FIGS. 3a and 3b are diagrammatic cross-sectional views of displays constituting embodiments of the invention and having two additional liquid crystal layers as compared with conventional displays;

FIG. 3c shows a diagrammatic cross-sectional view and a view illustrating azimuthal orientations of an example of the display of FIG. 3a;

FIG. 5a is a diagrammatic cross-sectional view of a display constituting an embodiment of the invention and having four additional liquid crystal layers as compared with conventional displays;

FIG. 5b shows light intensity plots illustrating operation of the display of FIG. 5a;

FIG. 6b shows light intensity plots for the display of FIG. 6a;

FIGS. 7a and 7b illustrate liquid crystal configurations for wide and narrow view modes of the additional liquid crystal layers shown in FIG. 6a;

FIGS. 9a to 9c illustrate diagrammatically the use of a display having a two view mode for providing two independent views to different viewers and a single view wide angle mode;

FIG. 19a illustrates the pattering of a patterned alignment liquid crystal layer;

FIG. 19b illustrates intensity plots for different regions having the alignment shown in FIG. 19a;

FIG. 20 is a diagrammatic cross-sectional view of a display constituting an embodiment of the invention;

Like reference numerals refer to like parts throughout the drawings.

DETAILED DESCRIPTION

Figure 1A:
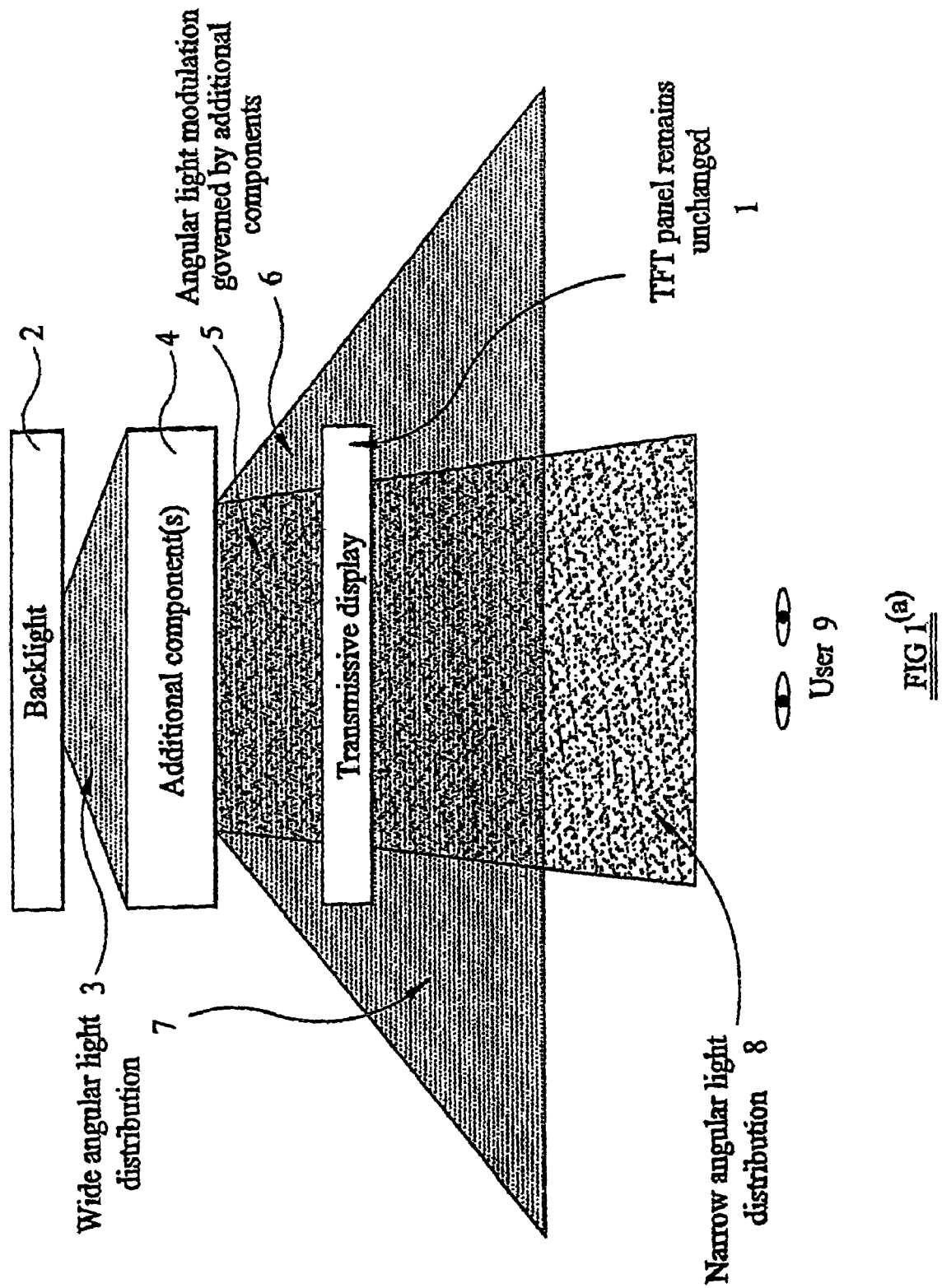
FIGS. 1a and 1b are diagrams schematically illustrating displays constituting embodiments of the invention.

FIG. 1a illustrates a display comprising a transmissive display device 1, which may be of conventional type and which does not require any change in order to provide a display having wide view and narrow view modes. For example, the display device 1 may be a thin film transistor (TFT) liquid crystal panel providing a pixellated full colour or monochrome display in response to image data supplied to the display.

The display also comprises a backlight 2 which emits light with reasonable uniformity of intensity throughout a relatively wide angular distribution range as shown at 3. The backlight 2 may also be of conventional type as used in known displays.

The display comprises one or more additional components 4 disposed in the light path from the backlight 2 to the display device 1. The or each additional component comprises a liquid crystal device having one or more liquid crystal layers and one or more polarisers. The or each device 4 provides angular light modulation, for example between narrow and wide viewing modes as shown at 5 and 6, in accordance with an electric field applied to the or each liquid crystal layer. The applied field may be switched between two values to give the two angular distributions or may be varied continuously or in discrete steps to give more than two angular viewing ranges.

In the arrangement illustrated in FIG. 1a, the additional component or components 4 have little effect on the angular light distribution 3 from the backlight 2 as illustrated at 7. However, when the display operates in the narrow mode, the or each component 4 is controlled so as to restrict the angular light distribution to a narrow range as illustrated at 8 so that a user 9 may only view the image or sequence of images displayed by the display device 1 in a relatively narrow angular vied range. This may be used, for example, to provide private viewing by a single user 9 and to prevent others outside the narrow angular viewing range from being able to see the displayed image. When the display is in the wide viewing mode, users such as 9 located anywhere within a relatively wide viewing angle may all see the displayed image.

Figure 1B:
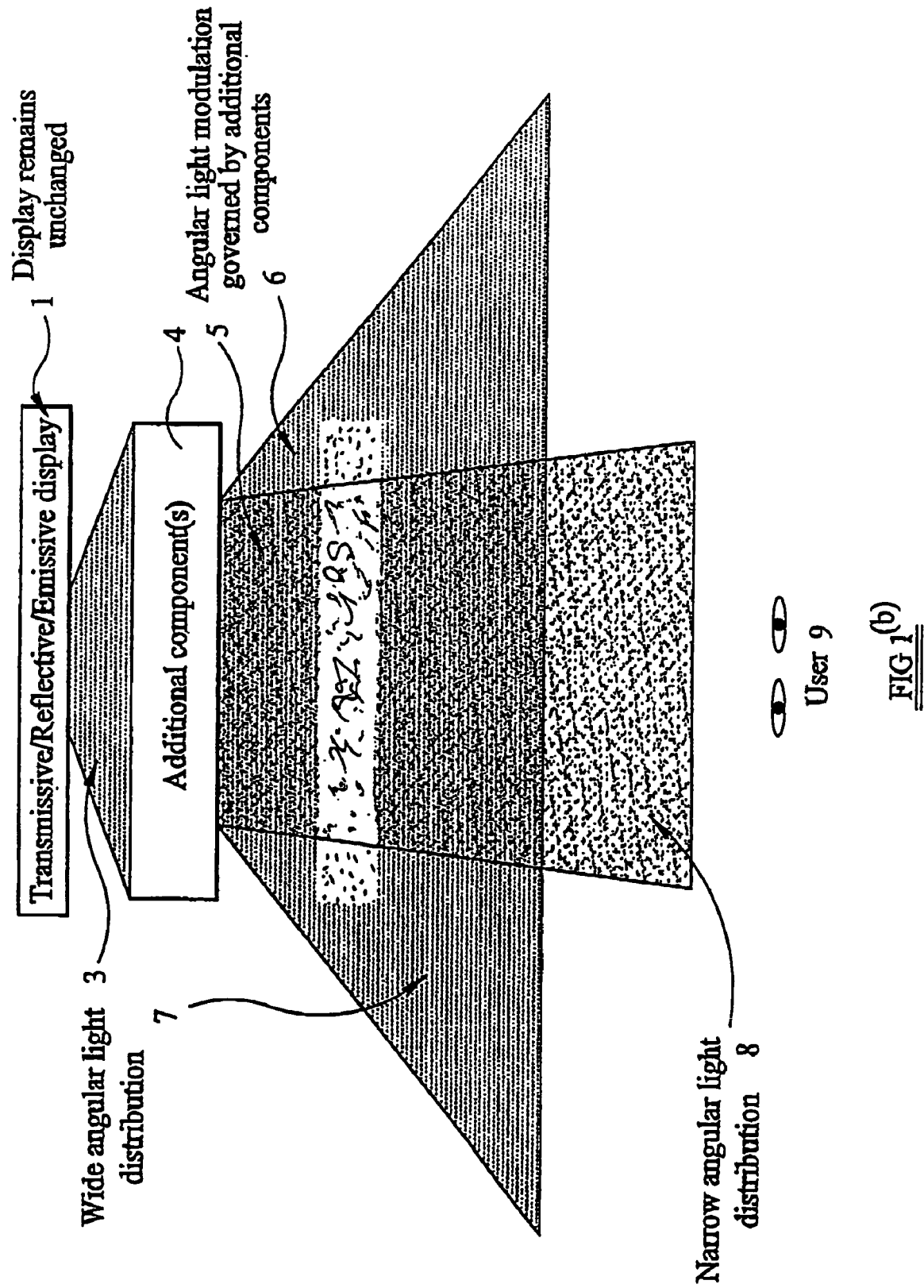

FIG. 1b illustrates a display which differs from that shown in FIG. 1a in that the or each additional component 4 is located in front of the display device 1. The display device 1 is not, therefore, limited to being of the transmissive type as illustrated in FIG. 1a but, instead, may be of any suitable type such as transmissive, reflective or emissive. The display device 1 provides a relatively wide angular light distribution as shown at 3 and the or each additional component 4 modulates the angular light distribution between wide and narrow modes as illustrated at 7 and 8.

FIGS. 2a and 2b illustrate examples of the displays shown in FIGS. 1a and 1b, respectively, for thin film transistor panels 1 of the transmissive liquid crystal type. Both displays thus have the backlight 2 and may be substantially identical except for the order in which the individual devices within the display are arranged. The liquid crystal display (LCD) panel 1 comprises a liquid crystal layer 10 disposed between input and output polarisers 11 and 12. Other components, such as substrates, alignment layers, electrode arrangements and filtering arrangements, have been omitted for clarity.

The additional components 4 comprise an additional liquid crystal layer 15 and an additional polariser 16. The layer 15 is disposed between uniform non-patterned alignment layers 15b and 15c, providing uniform liquid crystal alignment throughout the layer, formed on uniform non-patterned electrodes 15a and 15d. the use of uniform alignment layers avoids the cost and inconvenience of manufacturing patterned alignment layers. Again, elements such as substrates have been omitted from the drawing for the sake of clarity.

In the display of FIG. 2a, the additional components 4 are disposed between the LCD panel 1 and the backlight 2 so that the additional liquid crystal (LC) layer 15 cooperates with the polarisers 11 and 16. In the display of FIG. 2b, the additional components 4 are disposed in front of the LCD panel and the backlight 2 (forming a TFT module 1, 2) so that the additional LC layer 15 cooperates with the polarisers 12 and 16.

The LCD panel 1 are controlled so as to provide conventional image display of an image or a sequence of images in monochrome or in colour. Although the electrode arrangement of the additional LC layer 15 could be divided into several regions so that the viewing angle of the display may be different for different regions of the display, a single uniform electrode may be provided so that the viewing angle of the whole display is controlled between wide and narrow modes, possibly with a discrete or continuous range of intermediate viewing angle values. For example, the wide and narrow modes may be obtained by applying and removing, respectively, an electric field across the layer 15.

The additional liquid crystal layer 15 may be arranged to operate in any suitable liquid crystal mode. Examples of such modes include untwisted nematic, twisted nematic LIN), super-twisted nematic (STN), vertically aligned nematic (VAN) twisted vertically aligned nematic (TUAN) and hybrid aligned nematic (HAN) modes. However, liquid crystal materials other than nematic materials may also be used. Further, the liquid crystal layer 15 may be bistable so as to allow both the wide and narrow angle modes to be low power modes.

FIGS. 3*a* and 3*b* illustrate displays which differ from those shown in FIGS. 2*a* and 2*b*, respectively, in that the additional components 4 comprise a second liquid crystal layer 18 provided with uniform non-patterned alignment layers 18*b* and 18*c* formed an uniform non-patterned electrodes 18*a* and 18*d*. FIG. 3*c* illustrates a specific example of the display shown in FIG. 3*a*, in which the polarisers 11 and 16 have parallel transmission axes whose azimuthal orientation defines a reference or 0° direction. Each of the layers 15 and 18 comprises a 90° twisted nematic (TN) liquid crystal layer. The alignment direction and hence the director azimuth orientation at the upper surface of the layer 15 is at 0° to the reference direction whereas the director azimuthal orientation at the lower surface of the layer 15 is at 900 to the reference direction For the layer 18, the upper and lower director azimuthal orientations are at 90° and 0°, respectively, to the reference direction. In the wide mode, no voltage is applied across the layers 15 and 18 whereas, in the narrow mode, a field of two volts is applied across each of the layers 15 and 18.

Figure 4A:
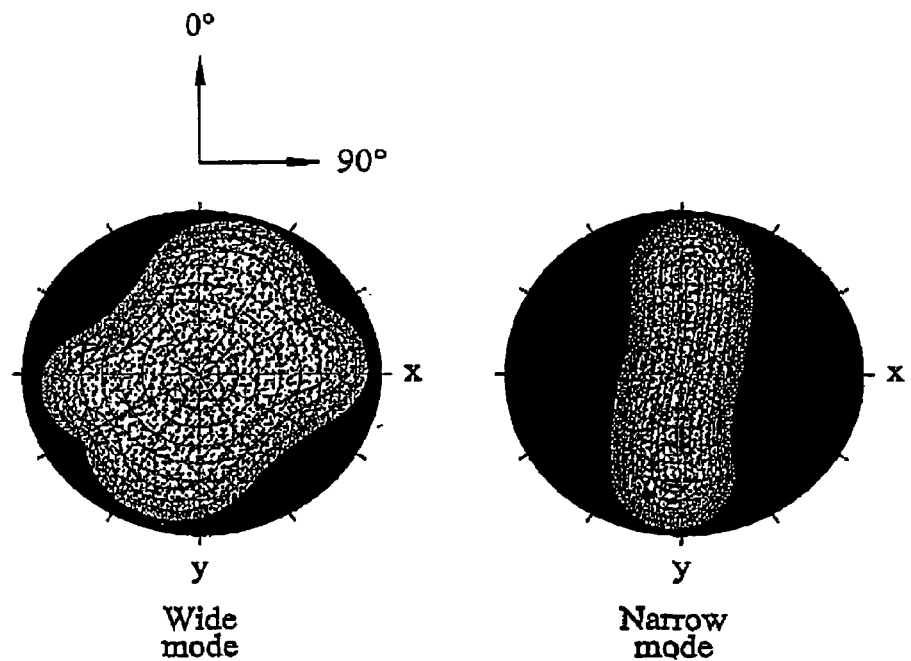
FIGS. 4a and 4b are light intensity plots illustrating wide and narrow modes of operation of the display illustrated in FIG. 3c.
Figure 4B:
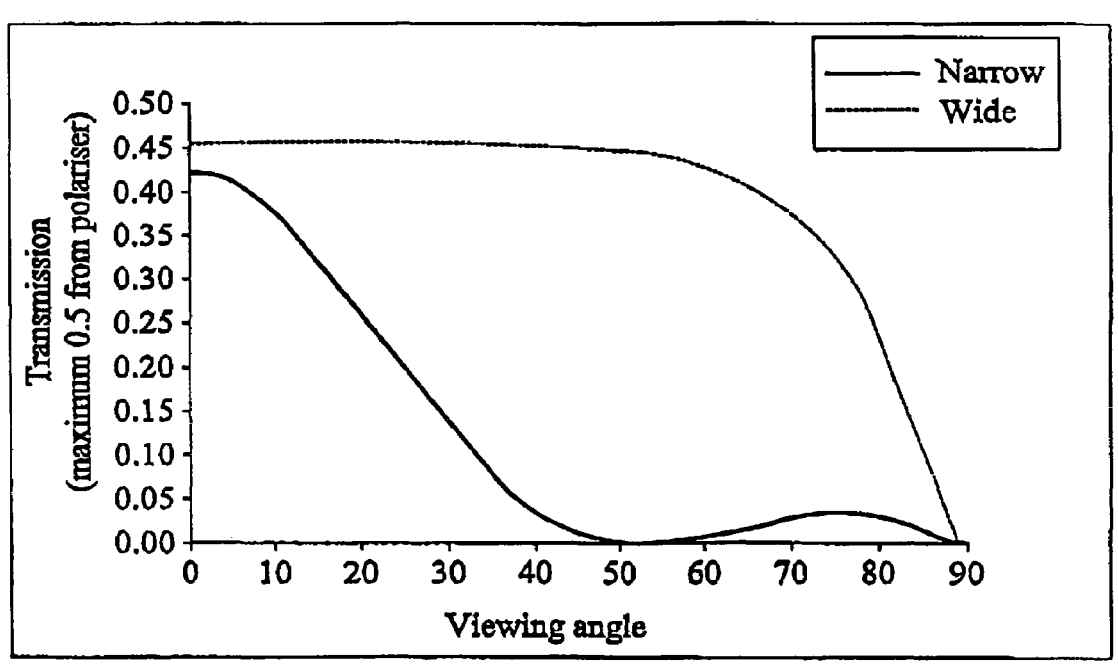

FIG. 4*a* shows light intensity plots for a 360° range of azimuth angles and a 90° range of polar angles for the wide and narrow modes. In the narrow mode, the TN liquid crystal layers 15 and 18 cooperate with the polarisers 11 and 16 to restrict the light intensity, and hence the viewing angle, in a horizontal plane. This is illustrated graphically in FIG. 4*b*, which shows light intensity against polar angle at 90° azimuth with 0° being normal to the display surface.

As mentioned hereinbefore, a continuous or discrete range of voltages may be applied to the layers 15 and 18. Also, the voltages applied to the layers 15 and 18 need not be the same. Further, although only one additional polariser 16 is shown, depending on the liquid crystal mode of the layers 15 and 18, it may be necessary or desirable to have a further additional polariser, for example disposed between the layers 15 and 18.

The display shown in FIG. 3*c* allows a relatively narrow viewing angle to be achieved in a plane with an azimuth angle of 90°. In order to provide a narrow viewing angle perpendicularly to this also, a display as shown in FIG. 5*a* may be provided.

The display shown in FIG. 5*a* differs from that shown in FIG. 3*c* in that another pair of liquid crystal layers 19 and 20 and another linear polariser 21 are provided and the display is of the type illustrated in FIG. 3*b* with the panel 1 between the backlight 2 and the additional components 4. The orientations of the liquid crystal layers 19 and 20 and the further Linear polariser 21 are the same as those of the liquid crystal layers 15 and 18 and the polariser 16, but the surface pretilt angles are different between the two sets of layers. The different surface pretilt angles give opposing twist between the two sets of layers. The liquid crystal layers have uniform non-patterned alignment layers and electrodes 19*a*-19*d*, 20*a*-20*d*.

FIG. 5*b* shows light intensity plots at 25 and 26 with only the layers 15 and 18 or only the layers 19 and 20 in the narrow view mode. The narrow view mode of the whole display is illustrated at 27 and the wide mode of the whole display is illustrated at 28.

Figure 6B:
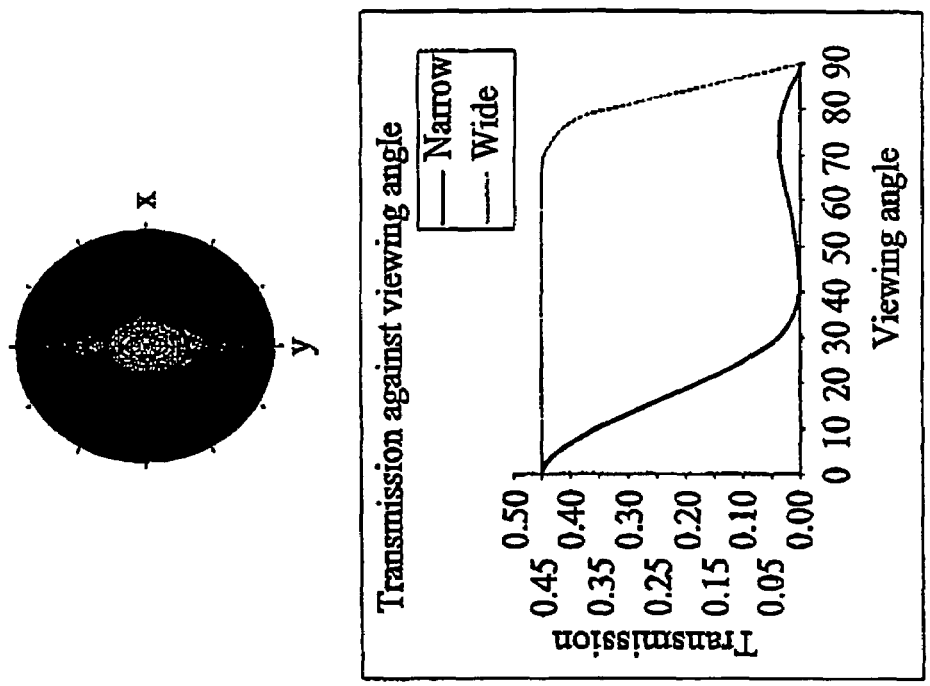
Figure 6A:
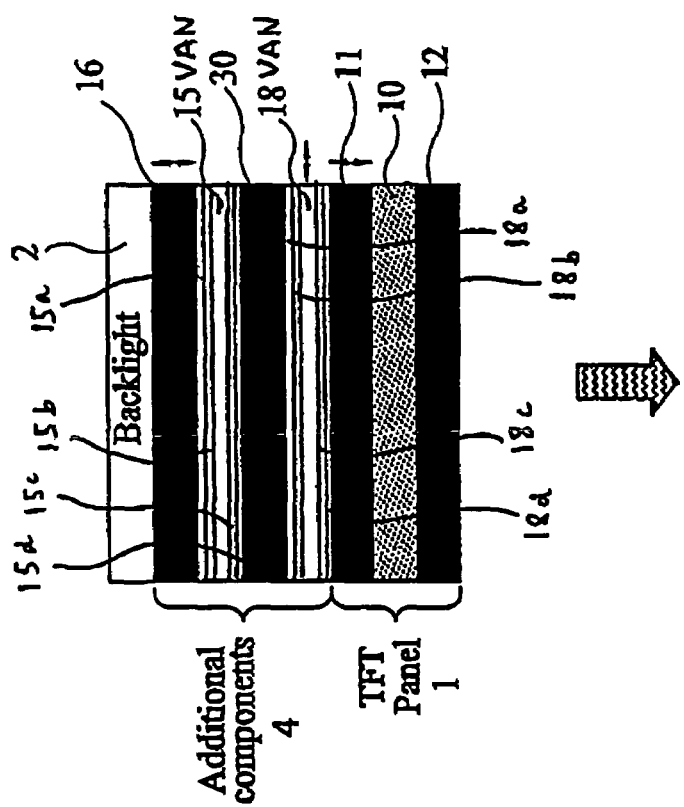
FIG. 6a is a diagrammatic cross-sectional view of a display constituting an embodiment of the invention having two additional liquid crystal layers as compared with conventional displays.

The display shown in FIG. 6*a* is of a similar type to that shown in FIG. 3*c* but differs in Mat the layers 15 and 18 operate in the vertically aligned nematic (V mode and are separated by a further polariser 30. The transmission axes of the polarisers 11 and 16 are parallel to each other and perpendicular to the transmission axes of the polariser 30.

Figure 7B:
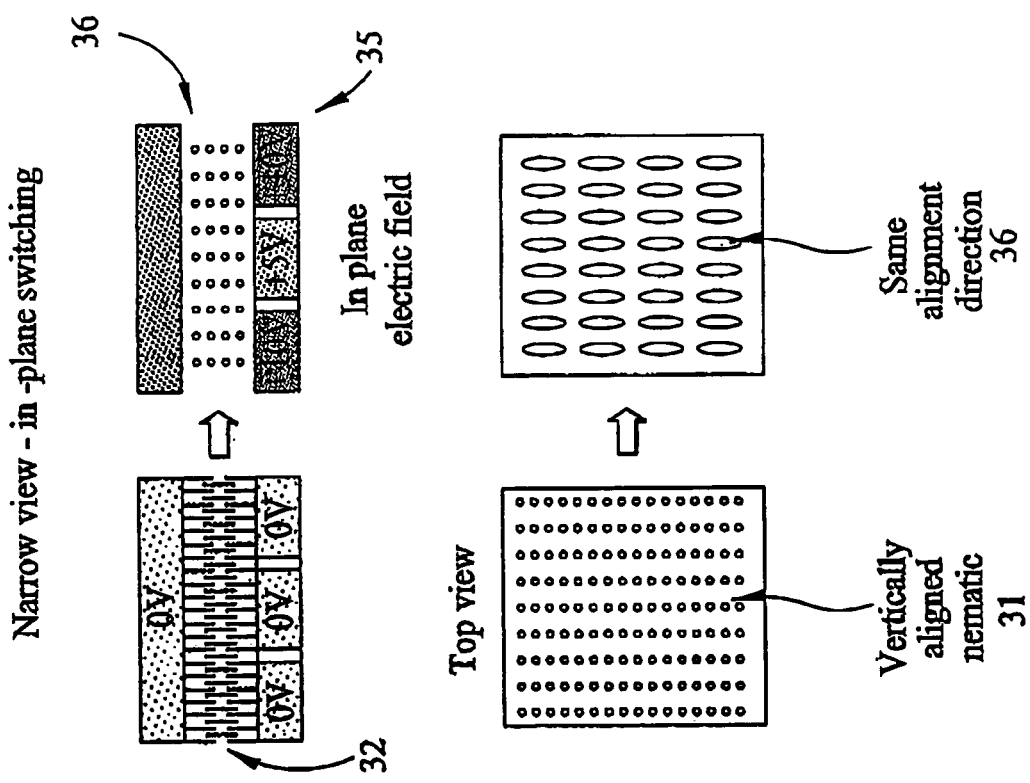
Figure 7A:
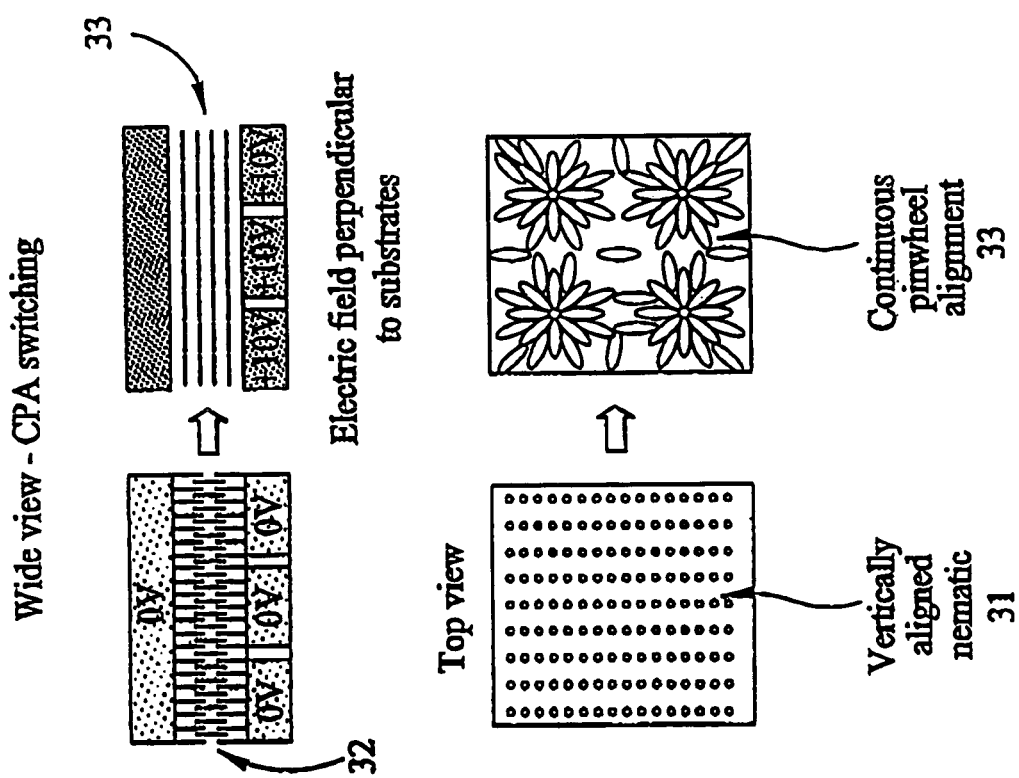

In this case, the liquid crystal layers 15 and 18 are disposed between electrodes 15*a*, 15*d*, 18*a*, 118*d*, one of which may be plane and the other of which is patterned so as to be able to switch each liquid crystal layer between the appropriate configurations of the liquid crystal directors. In the absence of any applied field, each of the layers is vertically aligned as illustrated at 31 and 32 in FIGS. 7*a* and 7*b*. In the wide viewing angle mode illustrated in FIG. 7*a*, an electric field is applied to each of the liquid crystal layers 15 and 18 so as to produce a continuous pinwheel alignment (CPA) as illustrated at 33. This is achieved by applying an electric field substantially perpendicular to the substrates with a suitable electrode structure and a cell surface of non-uniform flatness. This mode of operation provides a very wide angular distribution of light and thus gives a good wide-angle mode.

In the narrow mode, an electric field is applied using the electrode structure so as to introduce an in-plane geld as well as a field perpendicular to the cell surfaces as illustrated at 35. In this mode, the liquid crystal molecules align in the same direction which is generally in-plane, as illustrated at 36. By array the layers 15 and 18 such that the in-plane alignment directions in this mode are perpendicular to each other, a good narrow mode of operation may be obtained as illustrated by the light intensity plots in FIG. 6*b*.

Figure 8:
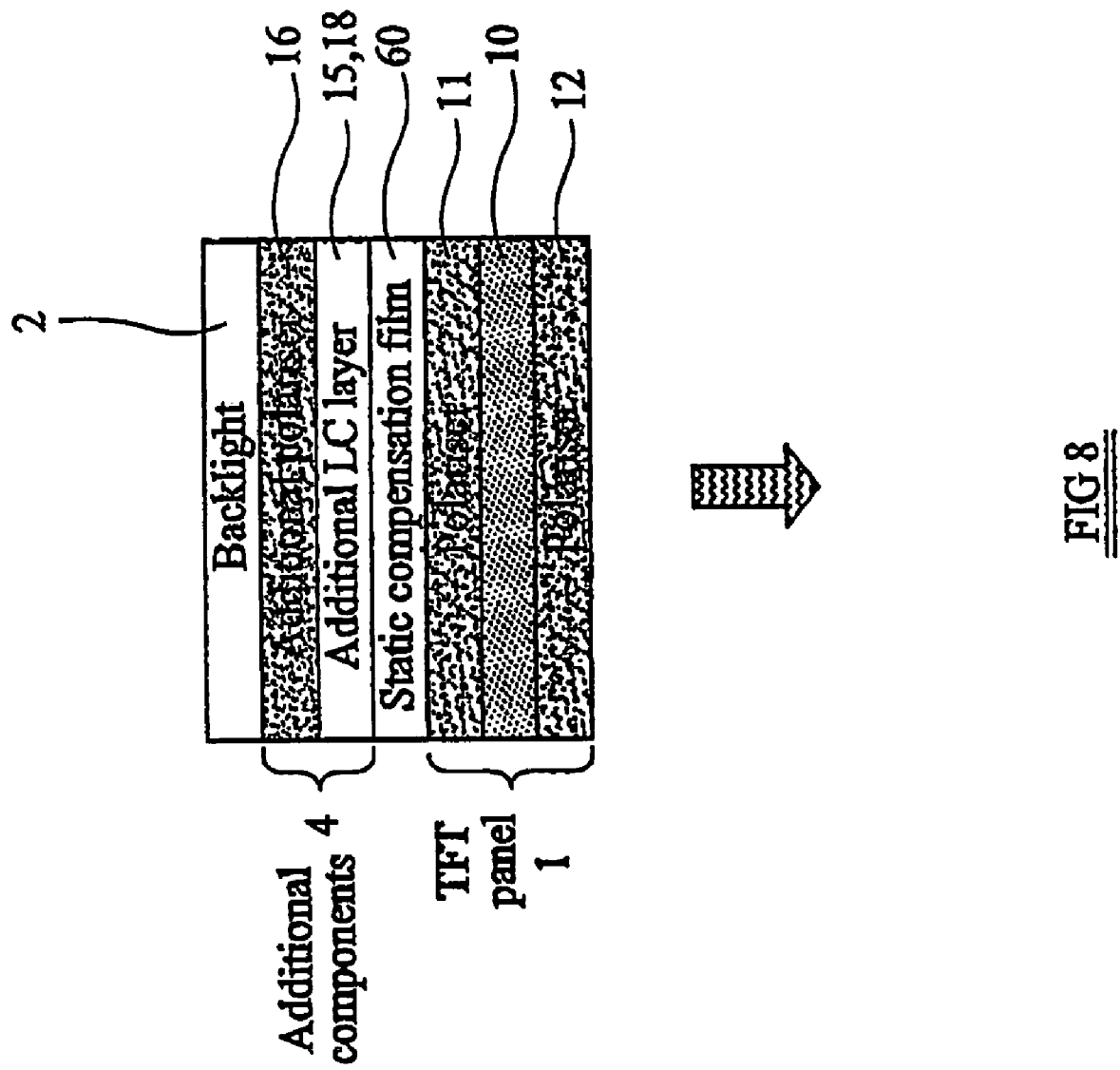
FIG. 8 is a diagrammatic cross-sectional view of a display constituting an embodiment of the invention and having a single additional liquid crystal layer and a static compensation film layer as compared with a conventional display.

The additional layers 4 may be used in combination with a static compensation film or films 60, as illustrated in FIG. 8. Such a combination allows the two different viewing angle modes to be achieved by switching the or each liquid crystal layer 15, 18 with an electric field. For example, in one of the modes, the liquid crystal layer or layers 15, 18 may counteract the optical effect of the static layer 60. In the other mode, the or each liquid crystal layer 15, 18 may be switched such that its optical effect combines with that of the static layer 60 to change the viewing angle characteristics.

An example of the embodiment described in FIG. 8 involves the static compensation film 60 being a short pitch cholesteric liquid crystal layer, acting as a static positive c-plate retarder. The pitch of Me liquid crystal layer 15, 18 is less than the wavelength of the light passed through it and, when unswitched, acts as a negative c-plate retarder. When switched with au electric field, the twist is "unwound", the liquid crystal layer 15, 18 aligns vertically and acts as a positive c-plate retarder. When the liquid crystal layer 15, 18 in the unswitched state is combined with the static compensation film 60, the unswitched state is fully compensated, giving a wide view mode of operation. Conversely, when the liquid crystal layer 15, 18 in the switched state is combined with the static compensation film 60, the retardation of both layers is added to give a narrow view mode of operation.

The embodiments described hereinbefore may be used as a switchable viewing angle compensator for a barrierless multiple-view display, for example of the type disclosed in GB2405516. Multiple-view displays which do not use a parallax optic may use the asymmetric viewing angle properties of the liquid crystal mode combined with a suitable driving scheme. For example, FIG. 9*a* illustrates a two view display comprising an asymmetric mode LC panel 40 whose pixels are allocated as first and second sets. The pixels of the first set, such as pixel 1, are addressed by a first driving scheme which produces an image for viewing in a first viewing region 41 whereas the pixels for the first set appear black in a second viewing region 42. Conversely, the pixels of the second set, such as pixel 2, are addressed or driven by a second driving scheme such that an image is visible in the viewing region 42 whereas the pixels of the second set appear black when viewed from the viewing region 41.

Such a display may be switched to a single view wide viewing angle mode by addressing or driving all of the pixels by a third driving scheme. The effect of this is illustrated in FIG. 9b, in which the third driving scheme results in a very wide but asymmetric viewing angle (including the normal to the display) being provided. However, the asymmetry of the viewing angle in this mode may be undesirable.

FIG. 9c illustrates an arrangement in which the asymmetry of the wide viewing angle is reduced or substantially removed. In particular, a further device 43 disposed in front of the panel 40 and comprising one or more liquid crystal compensation layers provides the viewing angle compensation. The device 43 may be switched when the display is in the two view mode either to have substantially no effect on the viewing angles of the viewing regions 41 and 42 or to provide some enhancement for the two view effect.

In some circumstances, displays which use a switchable parallax optic system to switch between single view and multiple view modes may advantageously also use the viewing angle properties of an asymmetric liquid crystal mode combined with a suitable driving scheme to enhance the image splitting performed by the parallax optic in the multiple view mode. When the display is switched for single view wide viewing angle operation, it may again be undesirable to have an asymmetric viewing angle characteristic. Thus, a device 43 comprising one or more liquid crystal layers may also be used to improve the viewing angle characteristics of the display in the wide viewing angle mode and to have no effect or to enhance the multiple view effect in the multiple view mode.

Figure 10A:
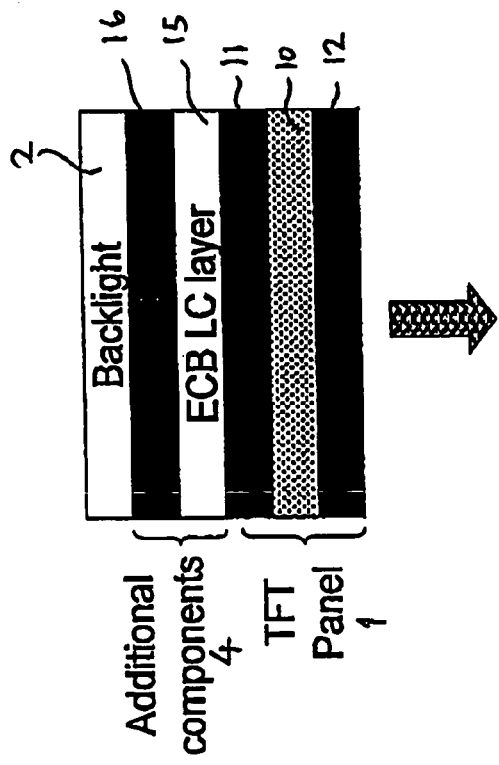
FIGS. 10a and 10b are diagrammatic views similar to FIG. 3c of a display constituting an embodiment of the invention.
Figure 10B:
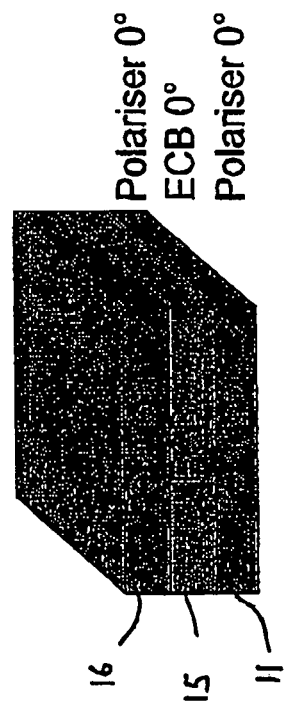
Figure 11B:
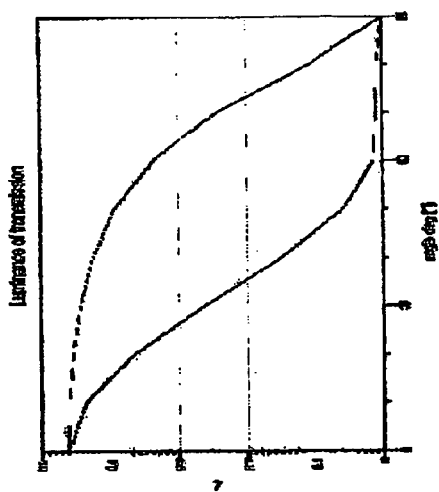
FIGS. 11a and 11b are intensity plots illustrating wide and narrow modes of operation of the display of FIGS. 10a and 10b.
Figure 11A:
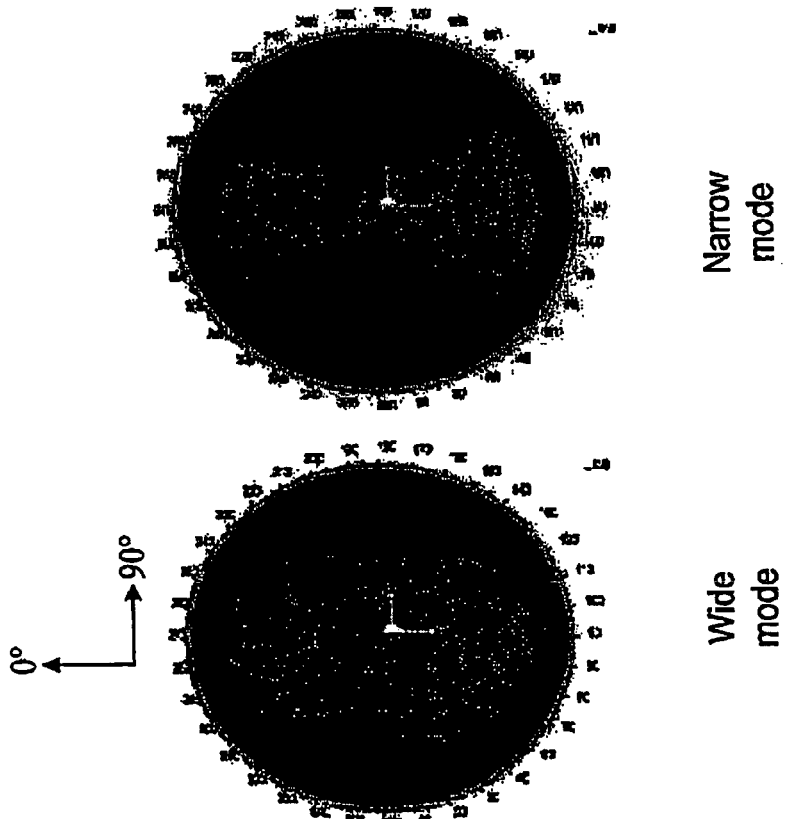

FIGS. 10a and 10b illustrate a display which differs from that shown in FIG. 2a in that the liquid crystal layer 15 comprises a parallel-aligned liquid crystal forming an electrically controlled birefringent (ECB) device. The polarisation transmission directions of the polarises 11 and 16 are parallel to each other and parallel to the alignment direction of the liquid crystal layer 15 as illustrated in FIG. 10b. With no voltage applied across the liquid crystal layer 15, the liquid crystal layer has substantially no effect and the transmission properties of the additional components 4 are substantially the same as those of two parallel polarisers, as illustrated in the "wide mode" shown in FIG. 11a. When a small voltage is applied across the liquid crystal layer 15, the narrow mode whose viewing angle properties are illustrated in the right-hand diagram of FIG. 11a are obtained. FIG. 11b illustrates luminance against angle for the 90° direction illustrated in FIG. 11a.

The ECB device may be formed between two substrates having transparent indium tin oxide (ITO) electrodes. The electrodes are coated with a polyimide alignment layer SE610 available from Nissan Chemical. The alignment layers are rubbed to provide an alignment direction and the substrates are then assembled such that the alignment directions are in anti-parallel. The substrates are spaced apart by 8 micromet using glass spacer beads and the resulting cell is filled with a liquid crystal of the type ZLI-4619-100. The resulting device is attached to the front of, for example, a conventional liquid crystal display of the transmissive type provided with a backlight. The rubbing directions of the alignment layers are parallel to the transmission direction of the front polariser of the image display. A further polariser is laminated to the front of the ECB device with its polarisation transmission direction parallel to the alignment layer rubbing directions. With no voltage applied to the liquid crystal layer of the ECB device, the display has a substantially unimpaired wide viewing angle. When a small voltage of approximately 2.3 volts is applied across the liquid crystal layer of the ECB device, the display provides a substantially low transmission in azimuthal directions at 90° to the alignment directions of the alignment layers of the ECB device.

Figure 12A:
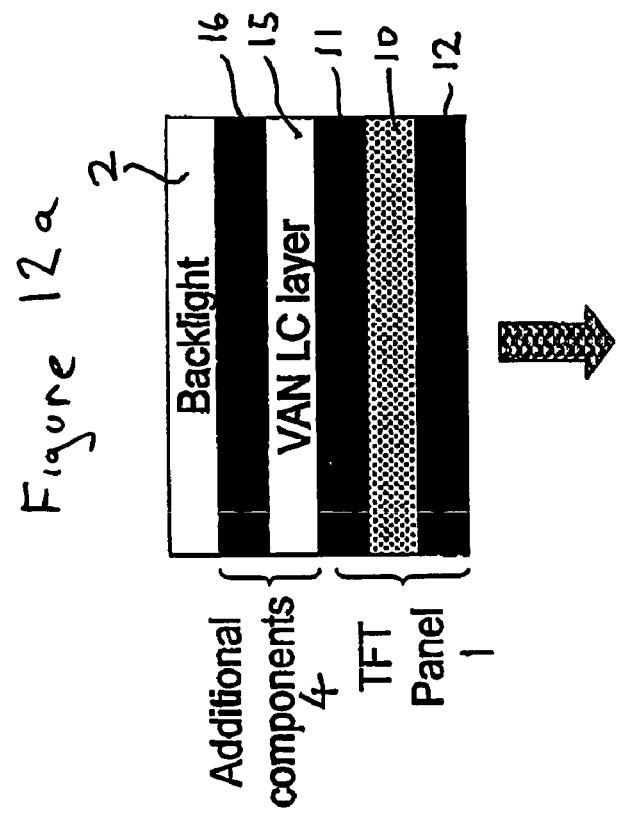
FIGS. 12a and 12b are diagrammatic views similar to FIG. 3c of a display constituting another embodiment of the invention.
Figure 12B:
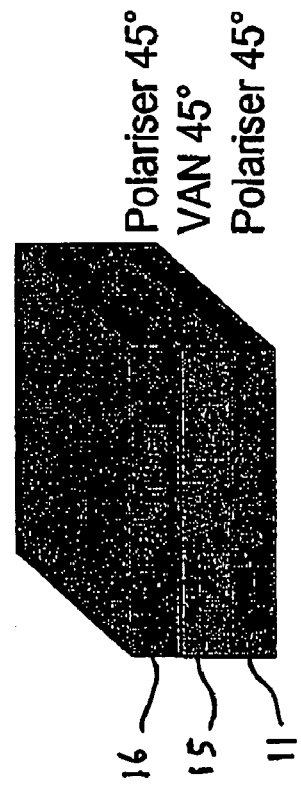
Figure 13B:
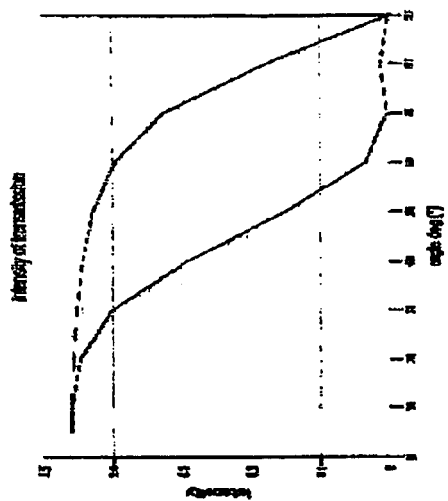
FIGS. 13a and 13b are light intensity plots illustrating wide and narrow modes of operation of the display of FIGS. 12a and 12b.
Figure 13A:
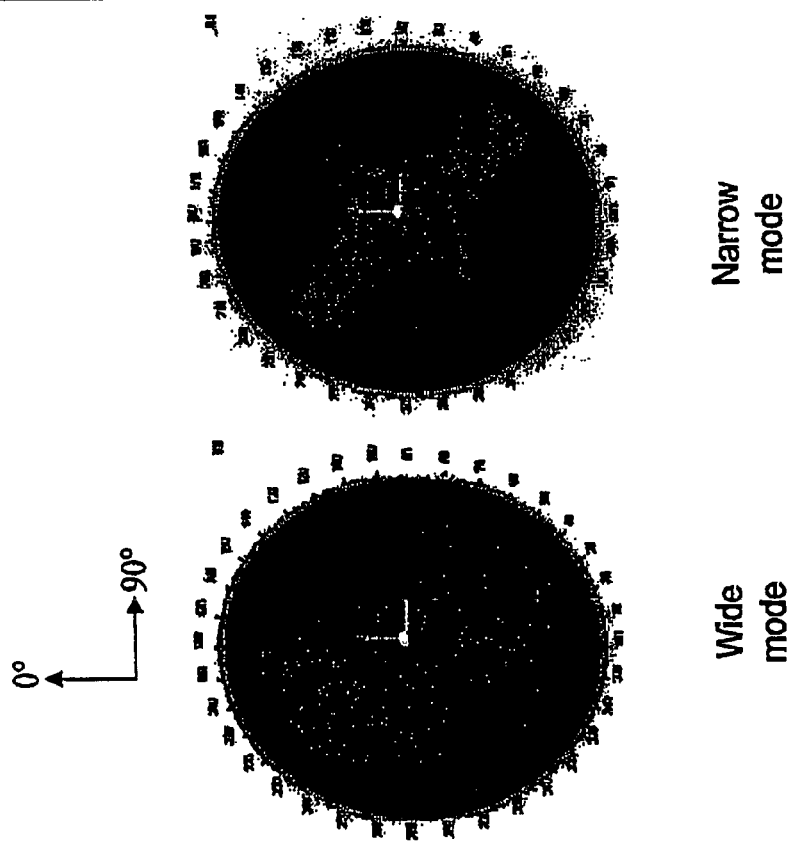

FIGS. 12a and 12b illustrate a display which differs from that shown in FIGS. 10a and 10b in that liquid crystal layer 15 is of the vertically aligned nematic (VAN) type. Again, the transmission directions of the polarisers 11 and 16 are parallel and also parallel to the liquid crystal director when the liquid crystal layer 15 is switched Again, with no voltage applied across the liquid crystal layer 15, the layer 15 has substantially no effect and the wide viewing angle mode illustrated in the left-hand par, of FIG. 13a is obtained. When a small voltage is applied across the layer 15, the narrow mode transmission characteristics illustrated in the right-had part of FIG. 13a and in FIG. 13b are obtained. The narrow mode performance illustrated in FIGS. 13a and 13b is for the case where the transmission directions of the polarisers 11 and 16 are oriented at 45° to the 0° azimuth angle shown in FIG. 13a.

In a specific example of such a device, ITO-coated substrates are coated with a polyimide alignment layer comprising JALS20017 available from JSR Chemical. The alignment layers are rubbed to provide an alignment direction with a very small tilt form the vertical or normal to the alignment layer. The substrates are assembled with the alignment directions in anti-parallel and are spaced by glass spacer beads to provide an 9 micromet cell gap. The cell is filled with a liquid crystal of type MLC-6610 and the resulting device is attached in front of a display, for example of the Sharp ASV type provided with a backlight. The rubbing directions of the alignment layers are parallel to the polarisation transmission directions of the front polariser of the image LCD, which is oriented at 45° to the horizontal.

A further polariser is laminated to the front of the device with its polarisation transmission direction parallel to the alignment layer rubbing directions. With no applied voltage to the layer 15, the VAN device has little or no effect on the viewing angle performance of the image display. With a voltage of 10 volts applied across the layer 15, substantially lower transmission is provided by the VAN device in azimuthal directions at 45° to the alignment directions of the layer 15.

Any of the embodiments described herein may be arranged to provide an indication to a user of when the display is in the private or narrow viewing angle mode. For example, this may be provided within software which cause an image or icon to be displayed to show the display is in the private mode. Such an icon may be overlaid, for example, on the displayed image at the bottom of the screen and may comprise the word "private". Alternatively, this function may be provided in the image display or in the additional components so that, when the display is switched to the private mode, a portion of the image display of the additional components is activated in order to display an appropriate icon.

The display described herein may be combined with or provided in association with a device or arrangement which automatically switches the display to the private mode when the content of the image to be displayed is of the appropriate type. For example, if the display is used for viewing internet pages, my of the software flags associated with internet pages may be used to trigger the display so that it operates in the private mode. An example of such an application is when a browser is working in a secure encrypted mode, for example when personal bank details are being viewed or when secure transactions are being conducted.

It is also possible to arrange for the display to switch to the private mode when the display is part of or is associated with a device for data entry and the typo of data being entered or about to be entered is such that the private display mode is required. For example, the entering of a personal identification number (PIN) may automatically cause the display to switch to the private mode. Such an arrangement may, for example, be used with "chip and pin" technology in retail trading outlets.

In many of the embodiments described herein the additional components provide the privacy or narrow viewing angle mode effectively by substantially blocking light passing through the image display 1 into the parts of wide the viewing angle region outside the narrow viewing angle region. However, it is also possible to block only partially the light outside the narrow viewing angle region during the narrow mode, for example so as to make visible a confusing or obscuring pattern superimposed on the image displayed by the display. In most of the embodiments described herein, the liquid crystal alignment layers of the additional components 4 are non-patterned or uniform so that the whole of the liquid crystal layer 15 is in a uniform state in both narrow and wide viewing angle modes, although the states differ between these modes. When the display provides the narrow or private mode by completely blocking light outside the narrow viewing angle region, the electrodes associated with the layer 15 may also be non-patterned. However, when a confusing or obscuring image is to be provided in order to restrict the intelligibility of the displayed image to the narrow viewing angle range, one or more patterned electrodes may be associated with the liquid crystal layer 15.

Figure 14:
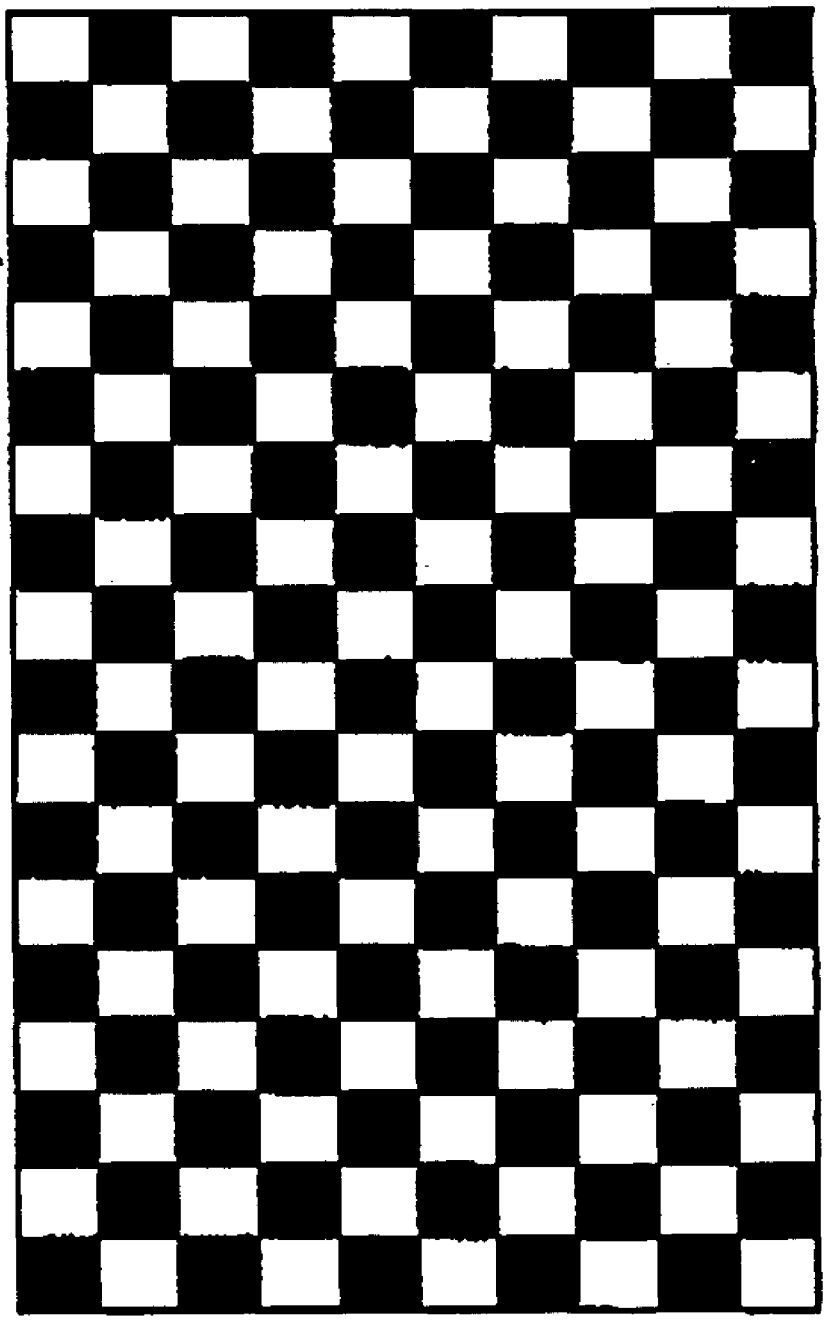
FIGS. 14 to 16 illustrate examples of electrode pattering.

For example, FIG. 14 illustrates the patterning of the electrode 15a to provide a fixed chequerboard or chessboard pattern. Thus, in the narrow viewing angle mode, the regions in FIG. 14 illustrated as black comprise portions of a single common electrode for applying a voltage across the liquid crystal layer 15 whereas the regions illustrated as white comprise gaps in the electrode such that no voltage is applied across the liquid crystal layer 15. It may thus be possible to provide a pattern seen outside the narrow viewing angle range which more effectively obscures the image displayed by the image display 1 so as to improve privacy.

Figure 15:
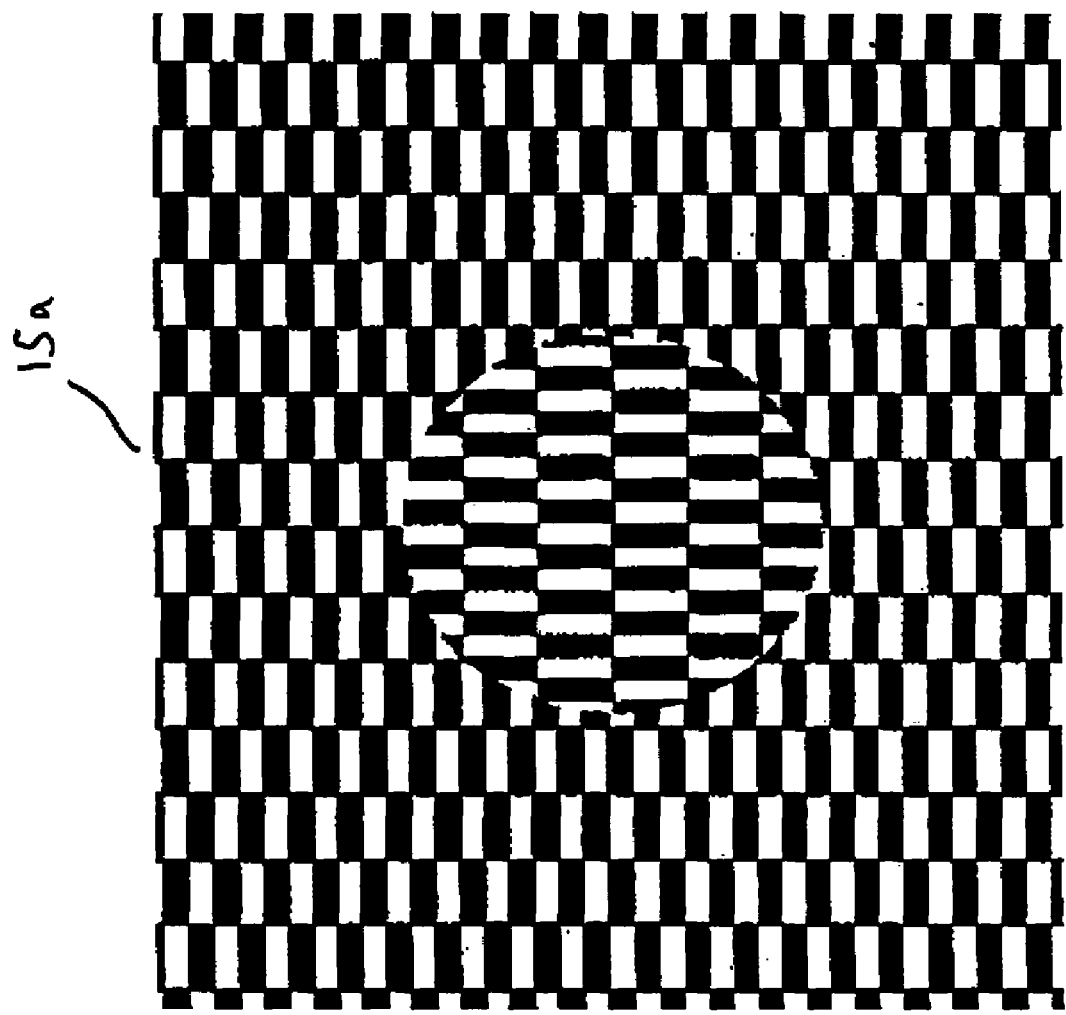
Figure 16:
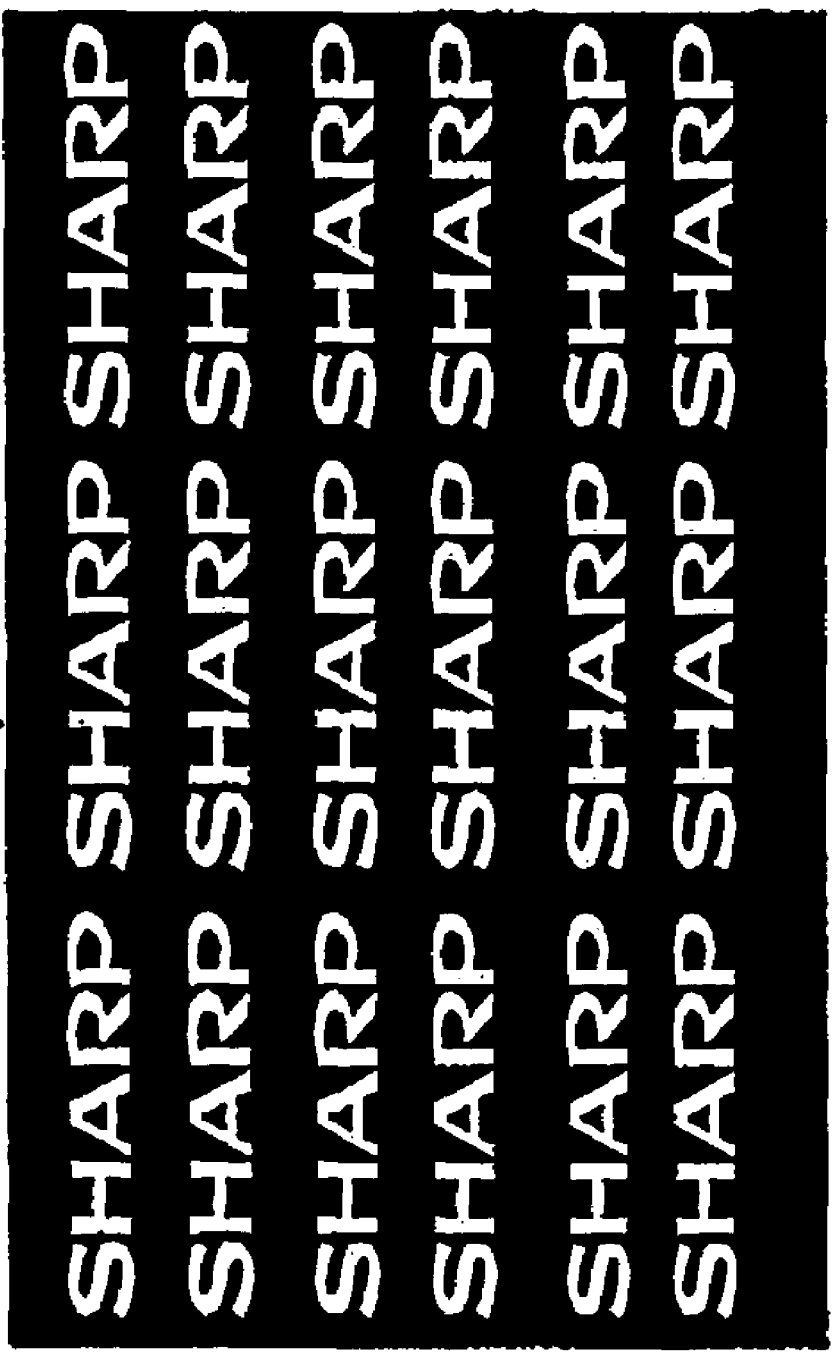

The patterning of the electrode 15a and the resulting confusing or obscuring image may be of any suitable type. As an alternative to the chequerboard pattern shown in FIG. 14 an image which induces an optical illusion may be provided and an example of this is illustrated in FIG. 15. Such an optical illusion-generating image may further improve the privacy in the narrow viewing angle mode. As a further alternative, the obscuring image may comprise text and an example of this illustrating the use of a company name or logo is illustrated in FIG. 16. The electrode 15a may be patterned with the appropriate text during fabrication and it is also possible to provide electrode patterning so that a choice of several different texts or other images may be selected.

The obscuring image is chosen to as to obscure the displayed image sufficiently to make it unintelligible outside the narrow viewing angle range. In order to achieve this, the obscuring image may comprise features of a size commensurate with the feature size in the displayed image. For example, a displayed image comprising text, for example in an e-mail, may be obscured by an obscuring image in the form of pattern having features of substantially the same size as characters in text.

In order to obscure different images having different feature sizes, different obscuring patterns having different feature sizes may be provided. For example, the electrodes such as 15a and 15d on opposite sides of the liquid crystal layer such as 15 may be patterned with the different feature sizes. Bach electrode is patterned so as to form at least two sets of regions whose applied voltages may be controlled independently of each other. The isolative gaps between adjacent regions are of the different sets made sufficiently small such that, when the same voltage is applied to the regions of all of the sets, the patterned electrode acts substantially as a uniform unpatterned electrode.

When the regions of the different sets of the electrode 15a receive different voltages and the regions of the different sets of the electrode 15d receive the same voltage, the patterning of the electrode 15a becomes visible as the obscuring image. Conversely, when the regions of the different sets of the electrode 15a receive the same voltage and the regions of the different sets of the electrode 15d receive different voltages, the patterning of the electrode 15d becomes visible as the obscuring image.

Such an arrangement may be used to allow selection between two different sizes of chequerboard patterns for obscuring text of two different character sizes. Such an arrangement may also be used if the display is to be viewed from substantially different distances. Switching between such patterns may be performed automatically according to the content of the data supplied for display, for example the main font size. Such an arrangement also allows selection between two different logos or messages "patterned" in the electrodes. For example, there may be a polite message and an impolite message with selection being made by a user.

In a further embodiment, the electrodes used for applying voltages across the liquid crystal layer or layers may be in the form of active or passive addressing matrices. For example, addressing may be by the known "duty method". Such matrix addressing allows any desired obscuring image to be created by supplying the appropriate image addressing data to the electrodes of the additional components 4. Thus, the obscuring image may be changed from time to time or may be changed or updated to provide a varying image in embodiments where the liquid crystal mode of the additional components 4 permits rapid image updating, for example at standard video speeds. Also, such matrix addressing arrangements allow obscuring images having different feature sizes to be selected as described hereinbefore.

Where such time-varying patterns or images are qui this may also be achieved by varying the voltage applied to a fixed electrode pattern so as to vary the visibility of the obscuring image. Voltages can be progressively applied to different electrode areas so that the form of the obscuring image varies with time. In the case of a matrix-addressable type of device, an arbitratory time-varying confusing image may be displayed and this may provide improved privacy when the image display is displaying "graphic" images as opposed to text. Such time-varying images may also be of types which induce optical illusions.

Figure 17:
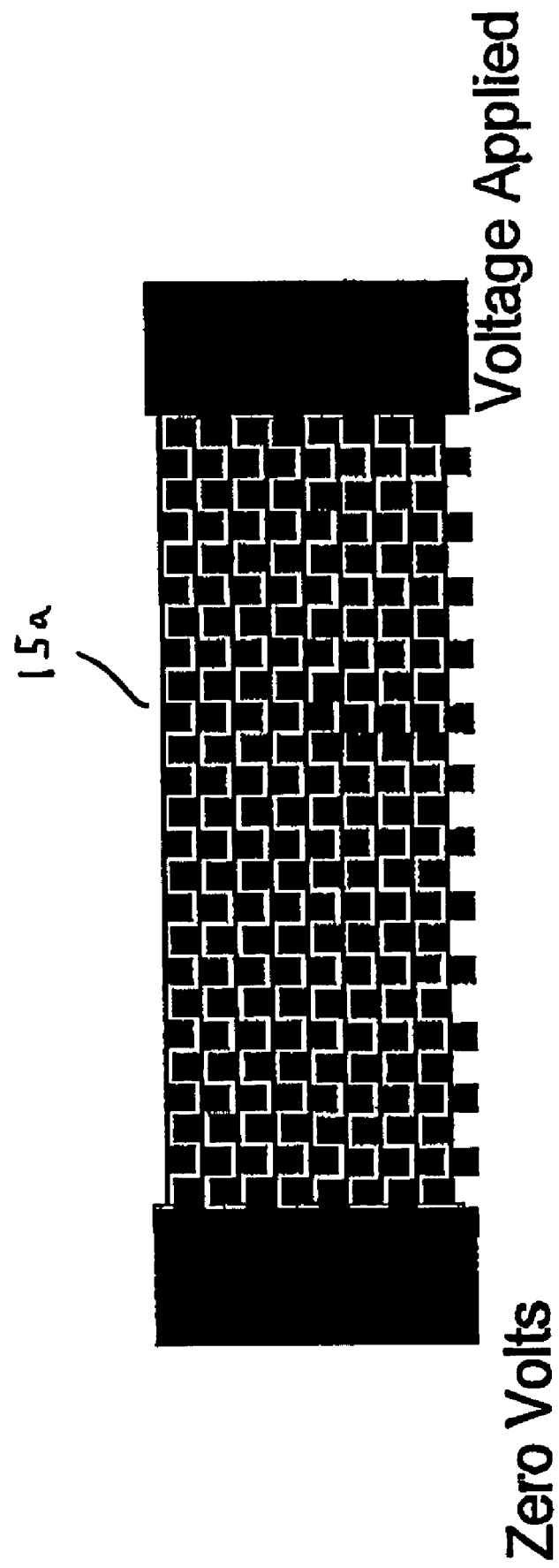
FIG. 17 illustrates an electrode arrangement and drive scheme for a display.

In the case of patterned electrodes, it may be possible for the pattern to be visible in the public or wide angle mode of the display because of optical loss from the electrode layer material. However, this may be substantially avoided by making the patterned electrode layer of two or more connected electrode areas with only narrow gaps therebetween to provide electrical isolation. For example, the gaps may be of the order of 10 micromet wide. Thus, substantially the entire visible area of a display may be covered with electrode layers which are sufficiently uniform to avoid the patterning being visible in the wide viewing angle mode. In the narrow viewing angle mode, a voltage is applied to selected electrode areas whereas other areas are set to zero volts. An example of suitable patterning of the electrode layer 15*a* is illustrated in FIG. 17.

Alternatively or additionally, visibility during the wide angle mode of the patterned electrode layer may be substantially avoided by coating the electrode layer with an insulating layer of similar refracted index to the electrode material. The optical loss may therefore be made substantially uniform across the visible surface of the display.

Figure 18:
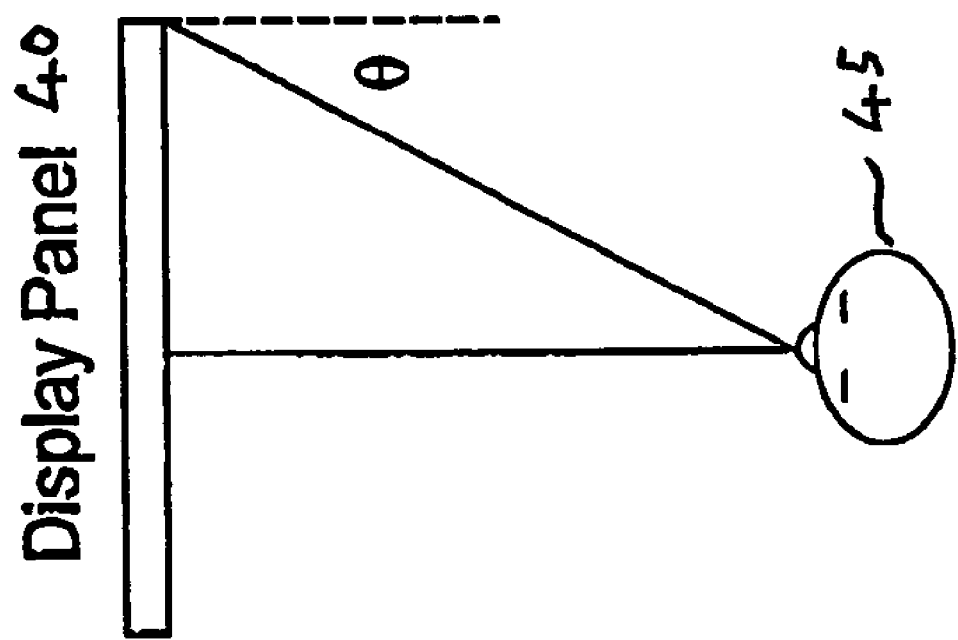
FIG. 18 illustrates the effect of off-normal viewing of edges of a display.

In some circumstances, it may be possible for the confusing or obscuring pattern to be visible during the private mode to a viewer viewing the display from within the narrow viewing angle region. For example, as shown in FIG. 18, a viewer 45 may be in a position in front of the display panel 40 such that the viewing angle θ of the edges or corners of the display is sufficiently large for the confusing image to become visible. This effect may be avoided, for example, by applying a different voltage or voltages to the edges and/or corners of the liquid crystal layers of the additional components 4. Thus, the level of privacy provided by the edges and/or corners of the additional components may be independently adjusted so as to reduce the visibility of the confusing pattern to a correctly positioned viewer in the narrow or private mode of the display.

Figures 19A, 19B:
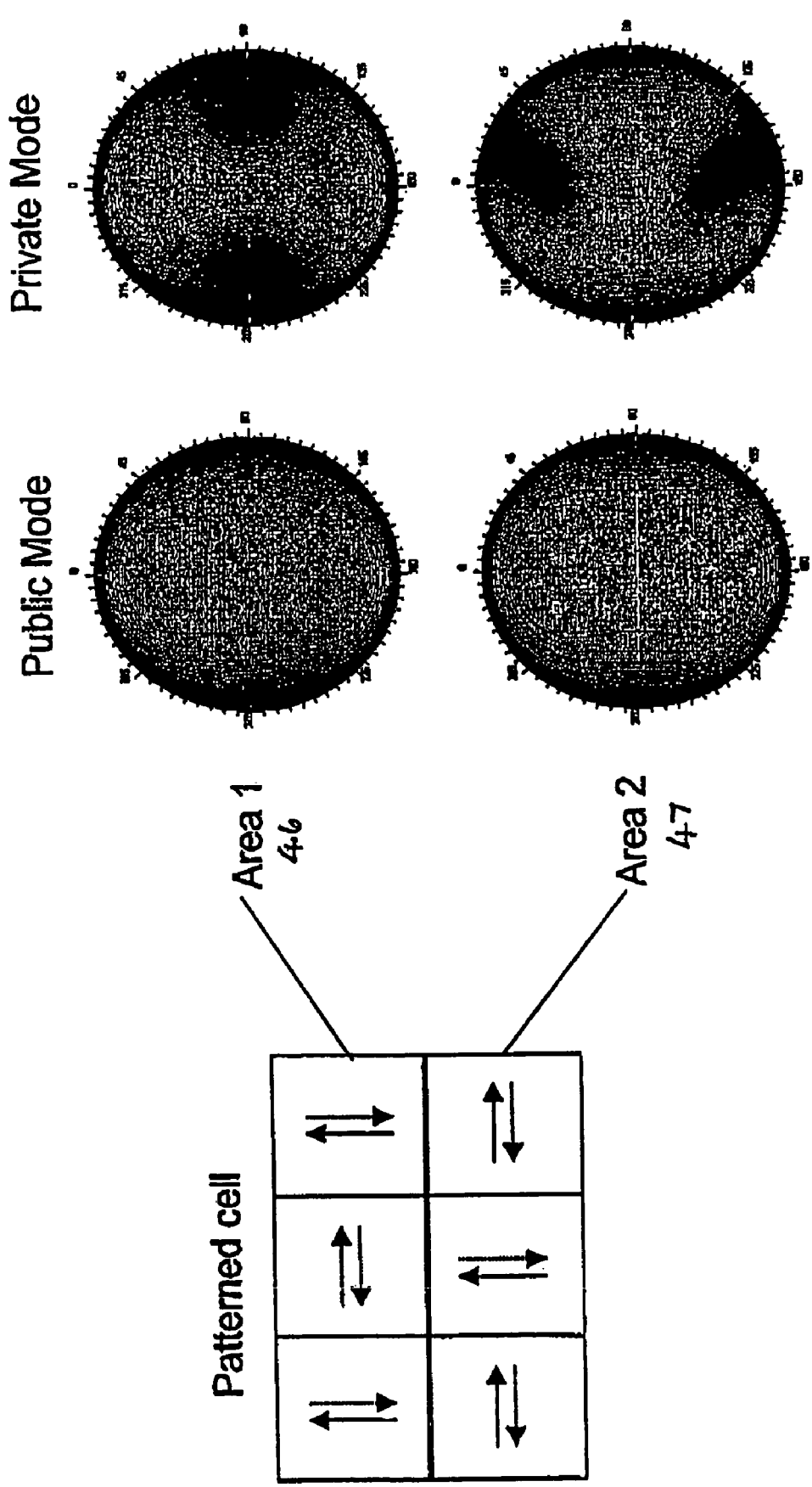

In the embodiments described hereinbefore, at least one liquid crystal layer in the additional components 4 restricts the viewing angle of the display in only one axis. Such embodiments have the advantage that no patterning of the alignment layers is necessary. However, by providing patterned alignment layers, it is possible for a single liquid crystal layer to restrict the viewing angle range, in the private mode, in two substantially orthogonal axes. Such an arrangement is illustrated in FIG. 19*a*, where regions of the alignment layers of orthogonal alignment directions are arranged as a chequerboard pattern. Thus, first areas such as 46 are illustrated in FIG. 19*a* as having vertical anti-parallel alignment whereas second areas such as 47 are illustrated as having horizontal anti-parallel alignment.

Such a display may be provided by forming an ECB device as the additional components 4. For example, two ITO substrates may be coated with a polyimide alignment layer SE610 from Nissan Chemical and rubbed to provide a first alignment direction. Each alignment layer may then be coated with a layer of Shipley 1805 photoresist. The photoresist is patterned by conventional photolithography to leave alternate regions of the alignment layer covered with photoresist and exposed. The partially exposed alignment layer is rubbed again to provide a second alignment direction, after which the photoresist layer is removed. The substrates are then assembled to provide the anti-parallel alignment in each individual region. In an example of such a device, the substrates are spaced apart by 8 micromet and the resulting liquid crystal cell is filled with liquid crystal material ZLI-4619-100. The resulting device is attached to the front of, for example, a conventional transmissive liquid crystal image display panel and backlight with the rubbing directions of one of the sets of patterned regions parallel to the transmission direction of the display front polariser. A further polariser is laminated to the front of the ECB device with its transmission direction parallel to that of the display polariser.

FIG. 18*b* illustrates the functions of transmission against viewing angle for the public and private modes for the areas 46 and 47. In the public mode, the ECB device has little effect on the viewing angle range of the image display 1. In the private mode, the areas 46 have the transmission properties illustrated in the upper right part of FIG. 19*b* whereas the areas 47 have the transmission properties illustrated in the lower right part of FIG. 19*b*. With the patterning illustrated in FIG. 19*a*, a chequerboard obscuring pattern is provided above and below the normal to the centre of the display as well as to the left and right of the normal. Thus, restricted viewing angle ranges are provided in two directions or axes by a single liquid crystal layer.

The multi-rubbing technique for forming the patterned alignment layers may, for example, be of the type disclosed in EP1047964. However, other techniques for forming patterned alignment layers may be used, such as by means of photoalignment or by surface grating alignment.

Although the additional components 4 may be non-removal, for example by being fixed to the image display 1 during manufacture, it is also possible to form the additional components 4 as a removal module or cover. For example, such a removal module may be arranged to be electrically connected to the image display 1 so as to obtain the appropriate power and control signals. Such an arrangement allows the additional components 4 to be removed so as to reduce the size and weight of the display when privacy is not required. Also, the additional components may be manufactured and supplied separately to allow standard display products to provide a narrow viewing angle or private mode of operation when desired.

FIG. 20 illustrates a display which differs from that shown in FIG. 2*b* in that the TFT module 1, 2 is replaced by an organic light emitting diode (OLED) display comprising an organic light emitting device 70 formed on a substrate 71. As is known, many OLED displays suffer from reflection of ambient light from the back electrode of the OLED layer and it is known to provide a circular polariser at the front of the display so as to overcome or reduce this effect. Thus, the display 1 shown in FIG. 20 includes such a circular polariser in the form of a quarter wave plate 72 and a linear polariser 12. Thus, polarised light is supplied to the liquid crystal layer 15 of the additional components 4 so that no further polariser between the layers 15 and 70 is required. However, if the display is of the type which does not include a circular polariser 12, 72, then light from the display 1 has to be linearly polarised before being supplied to the layer 15.

Figure 21B:
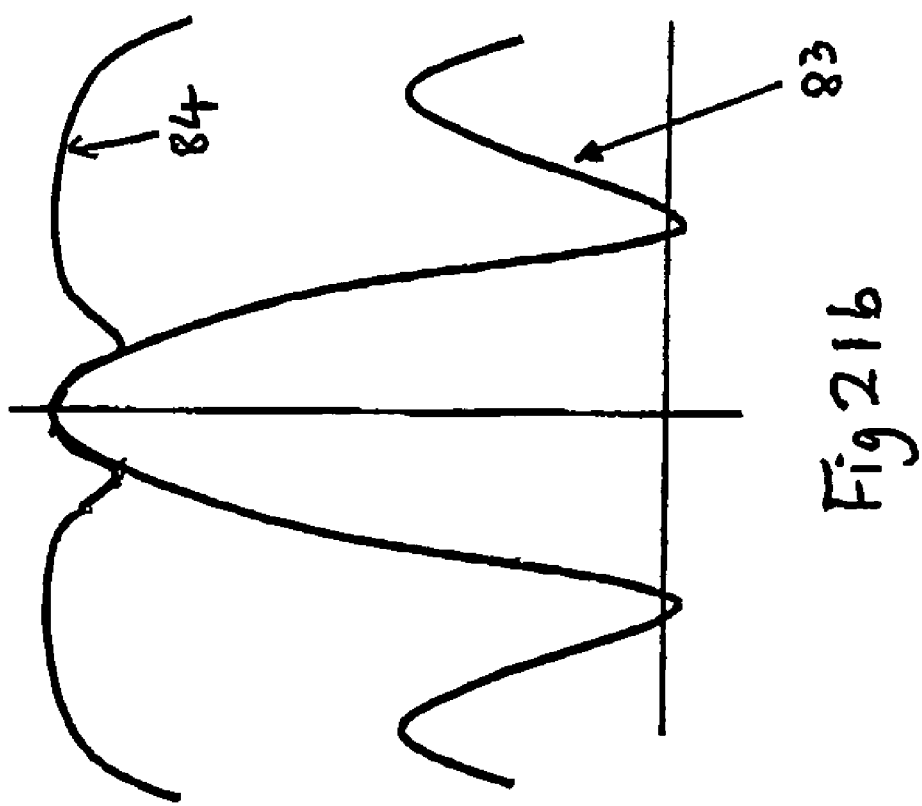
FIGS. 21a and 21b are graphs of transmission against angle illustrating ideal and practical transmission characteristics of a display.
Figure 21A:
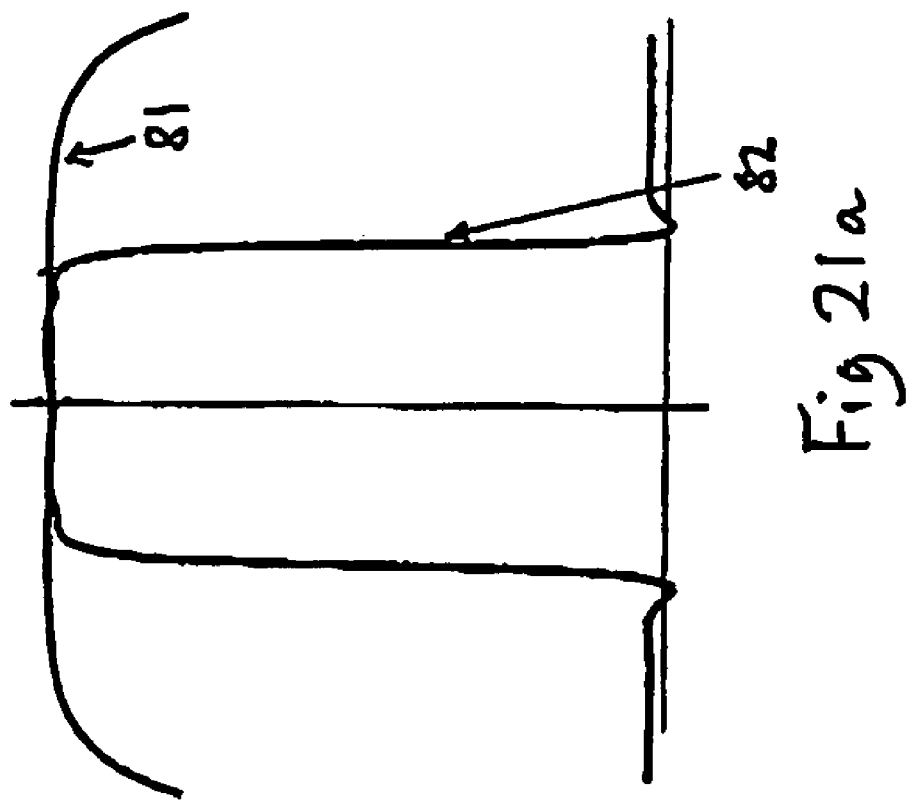

In the case of those embodiments which make use of an obscuring or confusing image in the privacy mode, it is desirable to have a small range of angles around the normal to the display in which the ratio of the transmissions of the different "types" of regions is equal to one during the privacy mode. In particular, in order for the obscuring pattern not to be visible in the private mode, the two or more regions should appear the same as each other irrespective of, possibly small, angles between the normal to the display and the positions of the viewer's eyes across the whole display area of the display. FIGS. 21*a* and 21*b* are graphs of brightness against viewing angles for each of two types of regions, for example for providing obscuring patterns of the types illustrated in FIGS. 14 to 16.

FIG. 21*a* illustrates the ideal transmission/angle characteristics of one of the types of regions at 81 and of the other of the types of regions at 82. Over a narrow range of angles on either side and including the display normal illustrated by the vertical axis of the graph, the ideal characteristics would be identical to each other and would be substantially flat at 100% transmission. The characteristic 82 would then fall to zero very rapidly and remain there throughout the remainder of the wide viewing angle range whereas the characteristic 81 would remain at the substantially constant high transmission value throughout the wide angle range. However, in practice, it is difficult to provide a liquid crystal mode having the sharp transmission from the high (for example 100%) transmission to the very low (for example 0%) transmission. In particular, in practice, the transmission against viewing angle characteristic falls more gradually with angular distance from the display normal and a more typical example of what is achievable is illustrated at 83 in FIG. 21b. If the characteristic 83 in FIG. 21b were combined with the characteristic 81 in FIG. 21a, the obscuring pattern would become visible at very small angles away from the normal to the display.

In order to reduce or substantially eliminate this effect, it is possible to modify the characteristic 81 such that it has the characteristic illustrated at 84 in FIG. 21b. For a small viewing angle range on either side of the display normal, the two characteristics are substantially identical so that the "contrast ratio" between these characteristics is equal to 1. The result of this is that, within this narrow viewing range, the obscuring pattern is substantially invisible in the narrow viewing angle mode and the only effect is a slight reduction in brightness with angular movement away from the normal. As the viewing angle with respect to the normal increases, the visibility of the obscuring pattern increases until it has the effect of substantially obscuring the image displayed by the image display for viewing angles outside the narrow viewing angle range.

Figure 22:
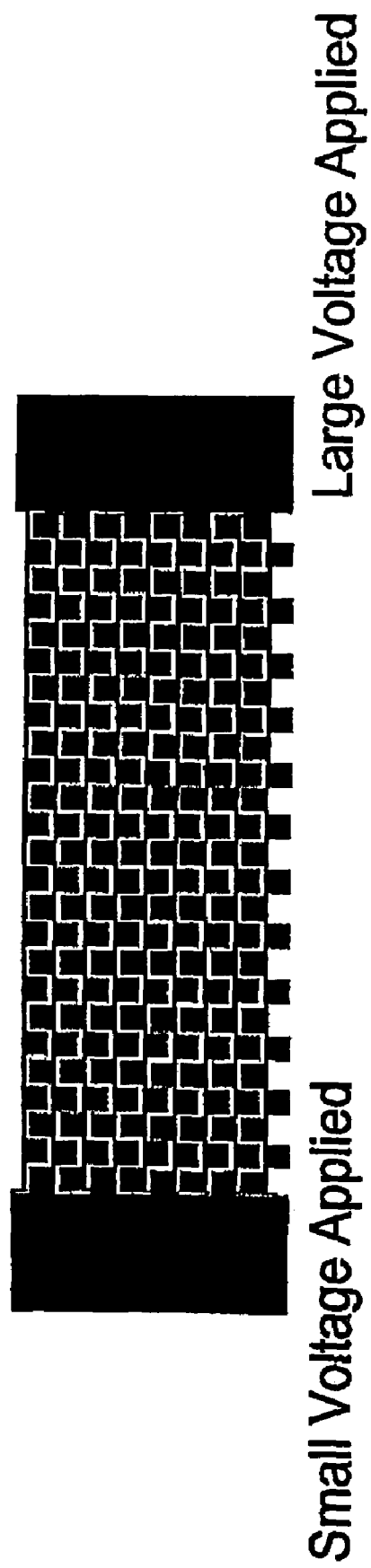
FIG. 22 illustrates another electrode arrangement and drive scheme.

In order to provide the characteristic 84, the voltage of the "higher transmission region" may be changed. For example, by applying a small voltage to the regions of an ECB layer which are not normally switched in the narrow mode, the transmission curve for these regions can be arranged to decreased rapidly at small angles away from the normal and then to increase at larger angles. The shape of the "small voltage curve" therefore more closely matches that of the "large voltage curve" for the small angular range around the normal. An electrode arrangement of the fixed type for achieving this is illustrated in FIG. 22.

A similar effect may be obtained by alternatively or additionally providing a uniform compensation layer for modifying the transmission/angle characteristic. Such a compensation layer may be used to change the transmission cure at zero or small voltages to match more closely the curve for the "switched" region.

In order to avoid any effect of a fixed compensation layer on the wide or public mode of operation of the display, a switchable compensation layer may be provided. Such a switchable layer may comprise liquid crystal material with an electrode arrangement which allows the compensation to be substantially removed for the public mode.

The compensation layer may be of a type which has an opposite direction of tilt to that in that additional components 4. Such a compensation layer may thus be arranged effectively to cancel the birefringence at small angles with respect to the normal but not at large angles. The effect of this is that, when a large voltage is applied to the patterned electrode, the transmission does not decrease so rapidly at small angles. The opposite tilt may be fixed or may be switchable in order to remove the effect in the public mode. Such a layer may be incorporated into a single device by using opposite tilt angles at the two surfaces of a liquid crystal layer, for example in an optically compensated birefringent (OCB or pi cell). The tilts at the opposite surfaces of such a layer may have different magnitudes in order to optimise the change in transmission at small angles with respect to the normal as compared with large angles.

Figure 23:
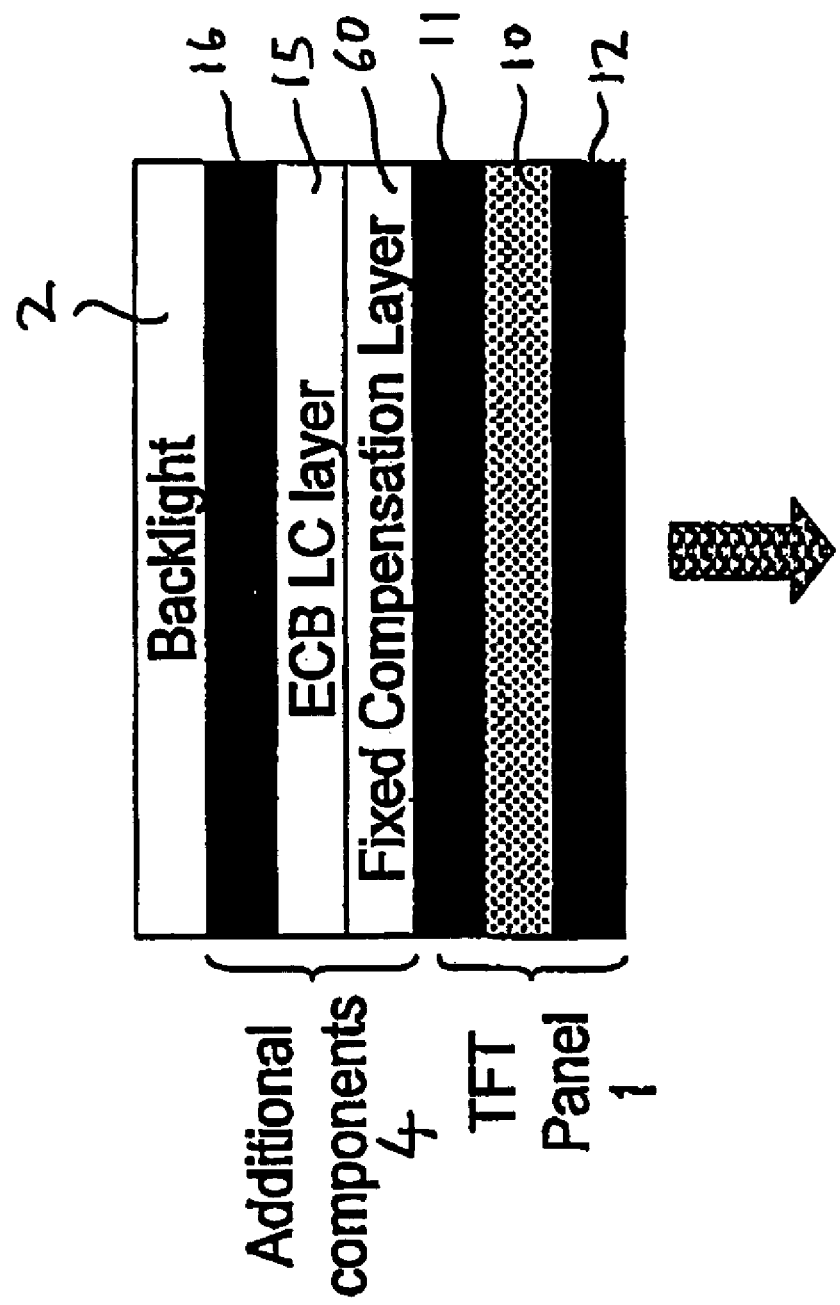
FIGS. 23 to 28 are diagrammatic cross-sectional views illustrating displays constituting further embodiments of the invention.

FIG. 23 illustrates the above techniques by including a fixed compensation layer 60 in association with an ECB layer 15 in the additional components 4. Although the layer 60 is shown between the layer 15 and the TFT panel 1, the order of these layers may be changed as appropriate.

Figure 24:
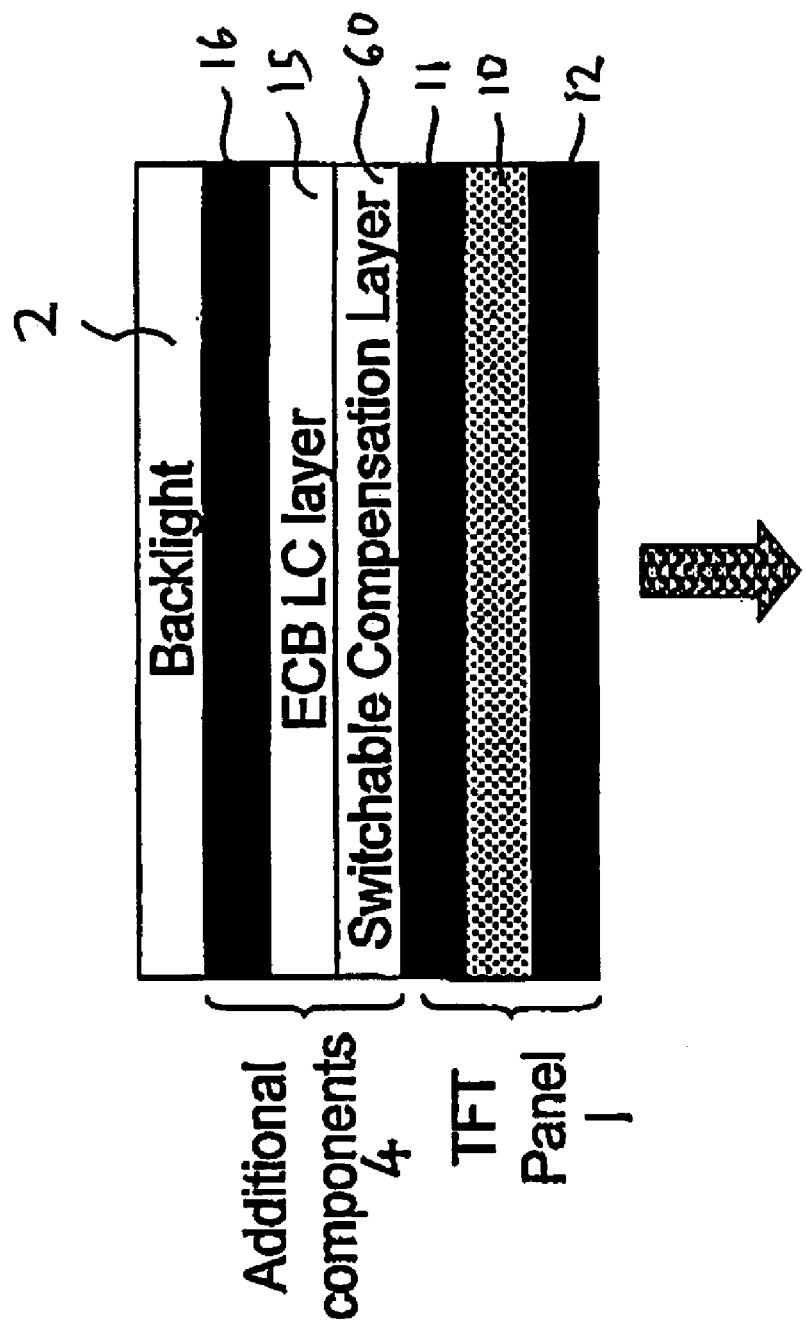
Figure 25:
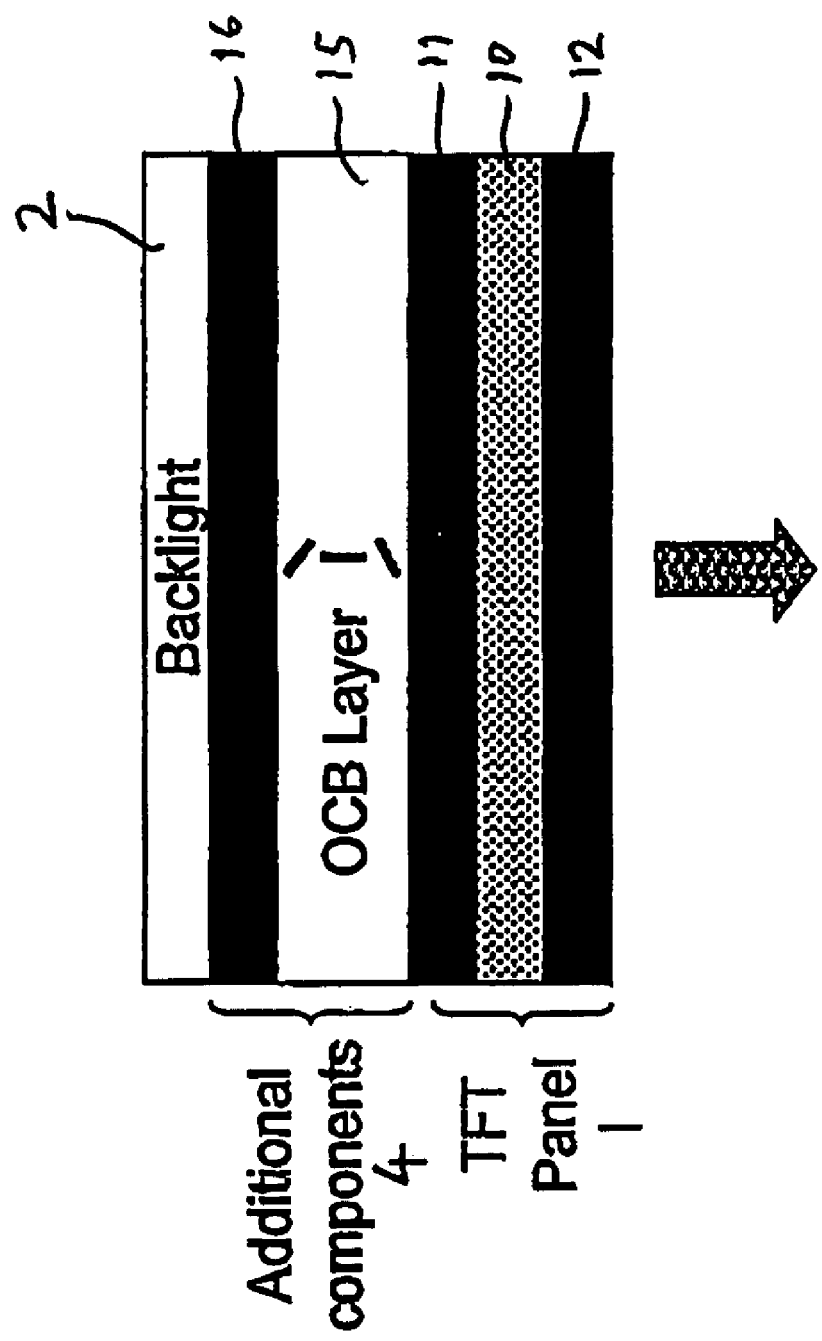

Similarly, FIG. 24 illustrates an arrangement in which the layer 60 is a switchable compensation layer and FIG. 25 illustrates an arrangement in which the two layers are combined into a single OCB layer with different but opposite directions of tilt at the two surfaces of the "combined" layer 15.

Figure 26:
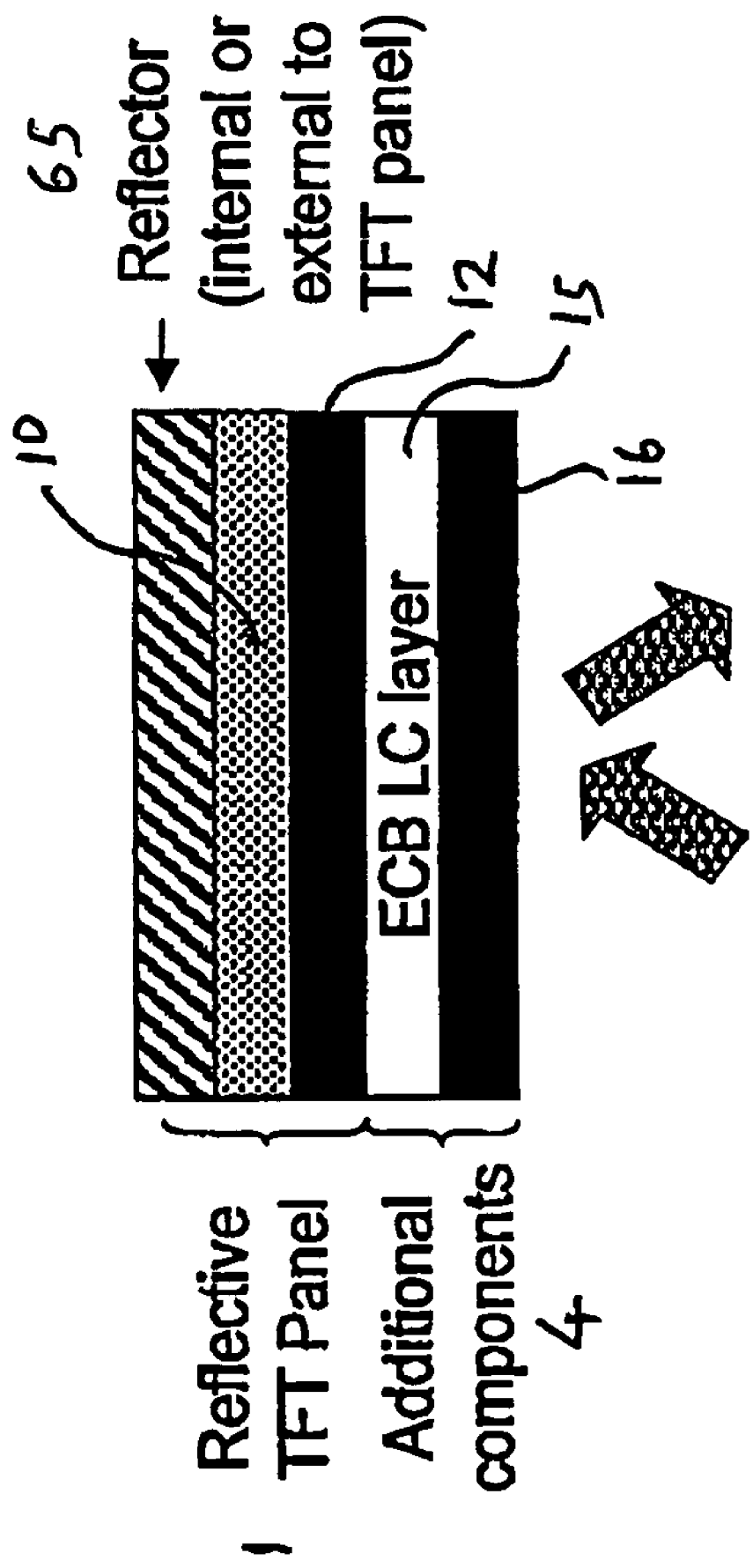

Although transmissive and emissive image displays have been described hereinbefore, similar techniques may be applied to reflective displays and an example of such a display is illustrated in FIG. 26. The additional components 4 are of the BCB type, for example as illustrated in FIG. 10a, but any of the other embodiments described herein may be used. The additional components 4 are provided on the front of a reflective image display in the form of a reflective TFT panel 1 comprising a liquid crystal layer 10, a polariser 12 and an internal or external reflector 65. The panel 1 may include retardation films as is known and a suitable example of such a panel comprises Sharp's HR TFT LCD. In the case of reflective image displays which do not include a front polariser, then a suitable polariser is additionally required between the layer 12 and the reflective image display.

Figure 27:
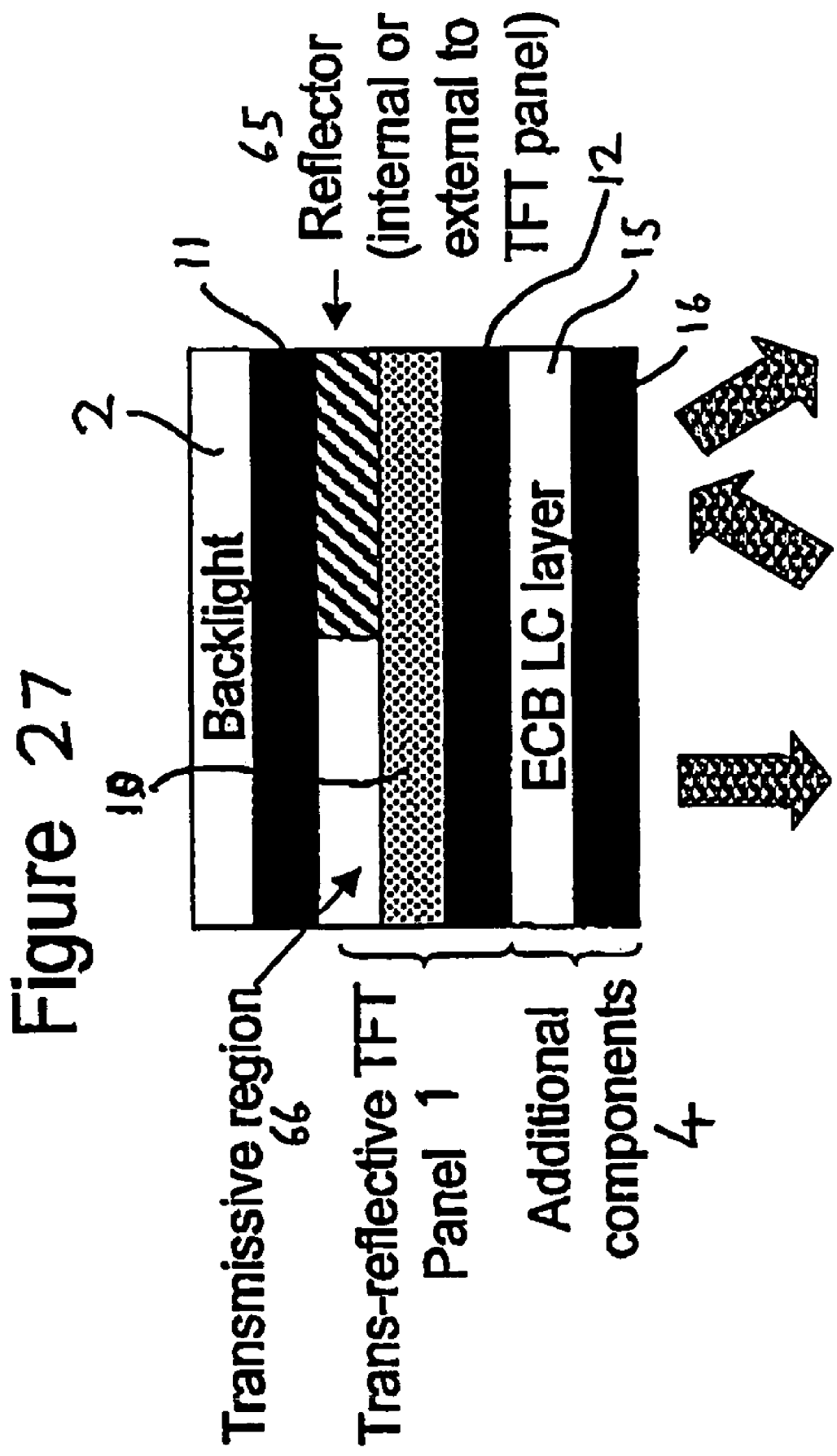

The image display 1 may also be of the transflective or transflective type and an example of such an arrangement is illustrated in FIG. 27. For example, the transflective display may be Sharp's Advance TFT LCD, comprising a polariser 12, a liquid crystal layer 10, retardation films (not shown), a patterned reflector 65 having transmissive regions 66, a polariser 11 and a backlight 2.

Figure 28:
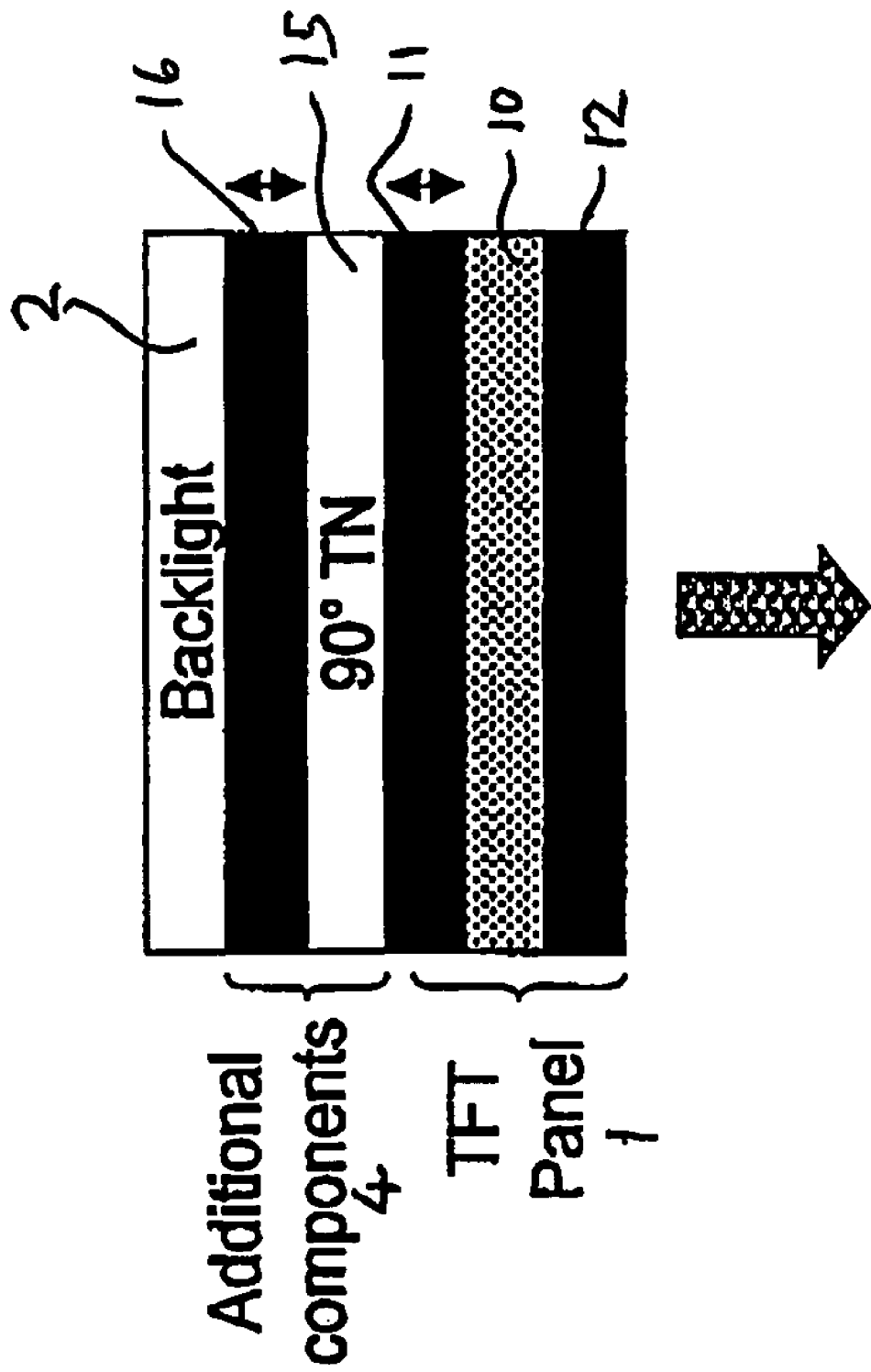
Figure 29:
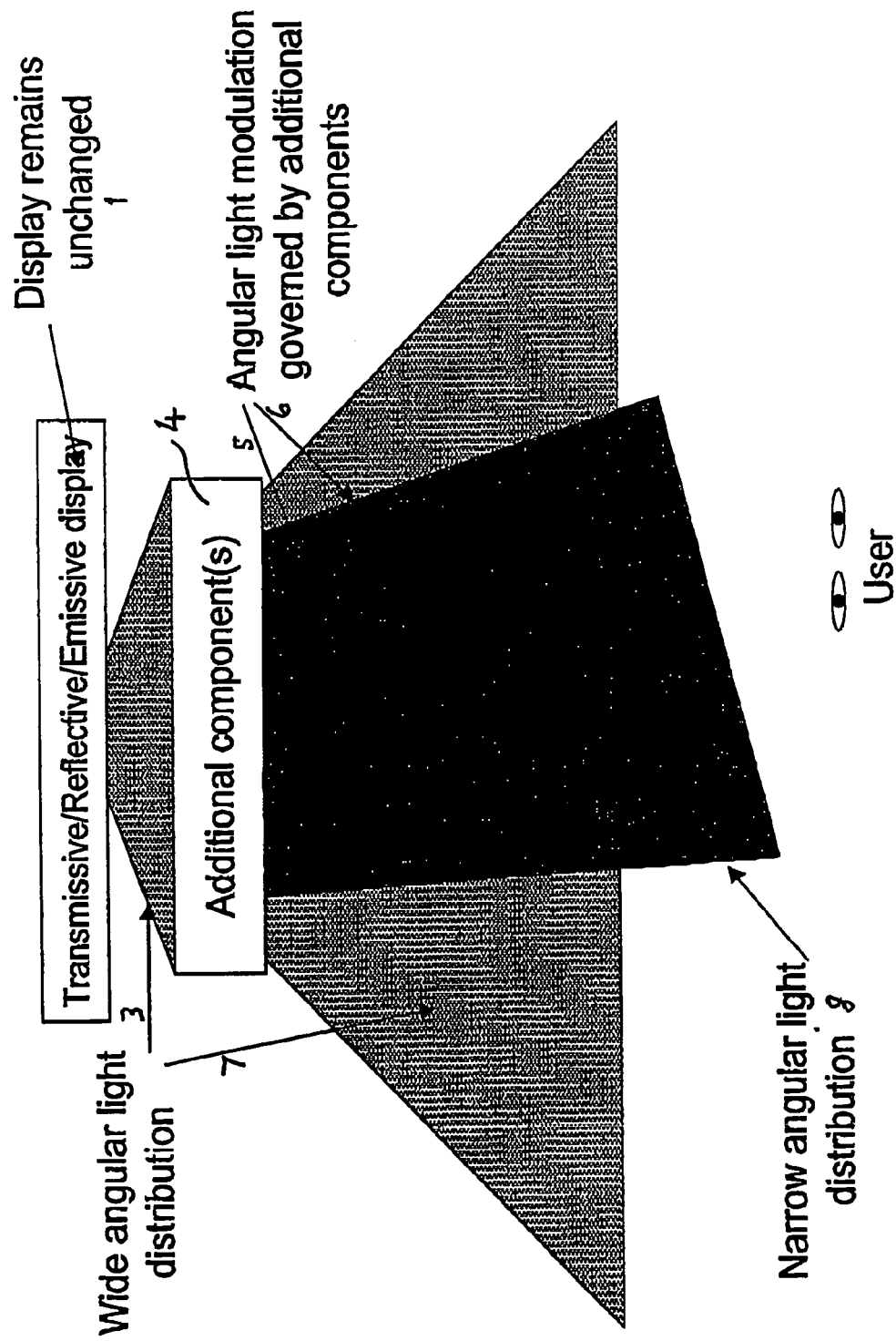
FIG. 29 illustrates diagrammatically the viewing angle performance of the display shown in FIG. 28.

In some applications, it may be desirable for the narrow viewing angle range to be such that its bisector is not normal to the display surface. This feature may be desirable when the display is used in an automotive application, for example in the dashboard of a vehicle. Such an arrangement could be used so that, in the narrow mode, a passenger or the driver is unable to view the displayed image. This characteristic may be achieved, for example, by using a 90° twisted nematic (TN) layer 15 between parallel polarisers 11 and 16 as illustrated in FIG. 28 and the effect of this on the narrow angular light distribution 8 is illustrated in FIG. 29.

Figure 30A:
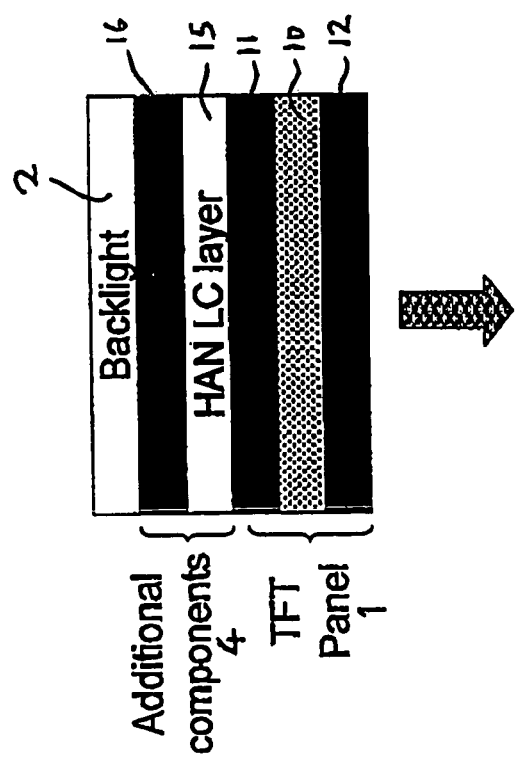
FIGS. 30a and 30b are diagrams illustrating a display constituting another embodiment of the invention.
Figure 30B:
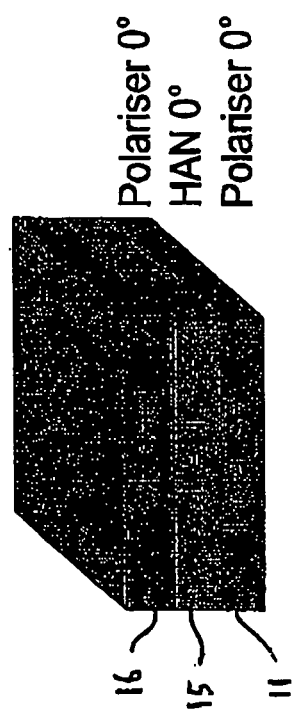

FIGS. 30a and 30b illustrate a display which differs from that shown in FIG. 2a in that the liquid crystal layer 15 is a hybrid aligned nematic (HAN) layer having substantially homoetropic alignment at one alignment surface and substantially homogenous alignment at the other alignment surface. As shown in FIG. 30b, the polarisation transmission directions of the polarisers 11 and 16 are parallel to each other and to the alignment direction of the liquid crystal layer 15.

Figure 31B:
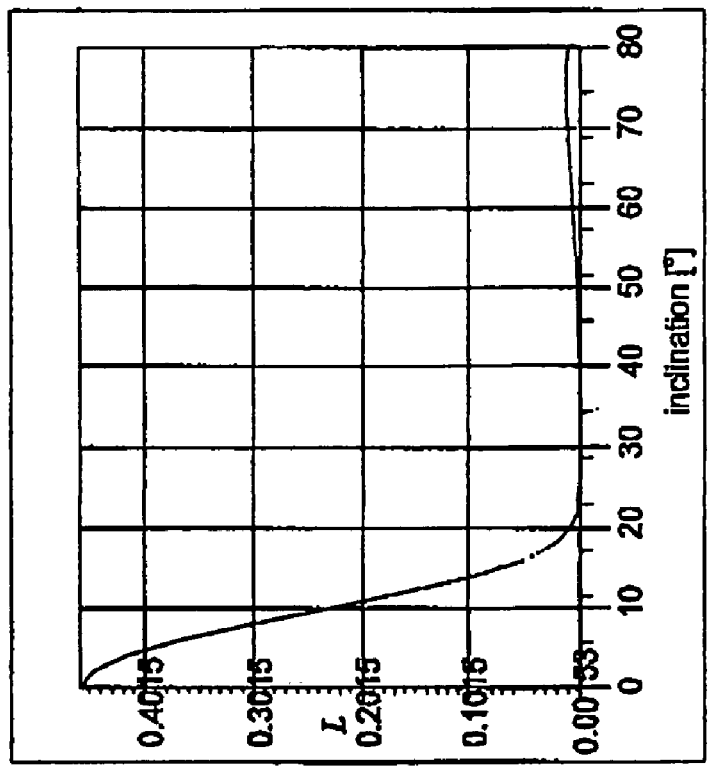
FIGS. 31a and 31b are intensity plots illustrating operation of the display of FIGS. 30a and 30b.
Figure 31A:
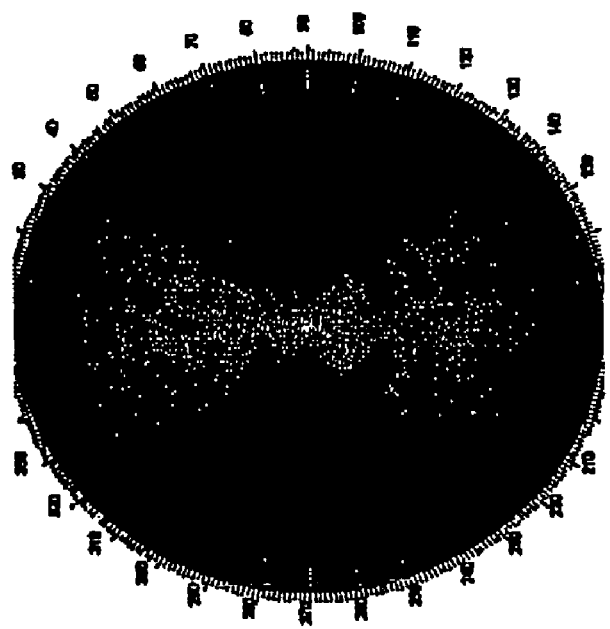

The performance of a display of this type in the privacy mode is illustrated in FIGS. 31a and 31b. As the retardation of the layer 15 in its unswitched state increases, the angle of light transmission through the layer decreases. For example, the retardation may be made relatively high by providing a relatively thick liquid crystal layer 15 (for example greater than 20 micromet). If the liquid crystal of the layer 15 has negative dielectric anisotropy, the liquid crystal director becomes almost planar when a voltage is applied to the layer 15 so that the additional components 4 have little effect on the viewing angle range. A greater privacy effect can be achieved compared to the HAN at zero volts if the HAN structure of the liquid crystal is distorted to a greater extent, as would be the case if the liquid crystal had a positive dielectric inisotropy and a voltage was applied.

Operation of the display illustrated in FIGS. 30a and 30b may be augmented by using a "two frequency" liquid crystal material. In such materials, the dielectric anisotropy of the material changes from negative to positive at a particular frequency. Thus, a display which is electrically switchable from public to private modes of operation may be provided by applying a voltage to a high retardation HAN layer as described hereinbefore but also modulating the frequency rather than the voltage (or rather than the voltage alone) such that the dielectric anisotropy changes from positive to negative.

What is claimed is:

1. A display comprising a display device which is controllable to provide image display and a first liquid crystal device having at least one liquid crystal layer whose molecules are switchable between a first state providing a first viewing angle range and a second state providing a second viewing angle range which is within and smaller than said first viewing angle range, said first liquid crystal device being arranged, when said liquid crystal molecules are in said second state, to block at least partially light propagating towards a part of said first viewing angle range outside said second viewing angle range, said first liquid crystal device comprising at least one alignment surface and said at least one liquid crystal layer being in contact with said at least one alignment surface, each said at least one alignment surface at each said at least one liquid crystal layer comprising a uniform non-patterned alignment surface, wherein said first liquid crystal device is arranged, when said liquid crystal molecules are in said second state, to superimpose, on light propagating towards said part of said first viewing angle range, a spatially varying amplitude constituting an obscuring pattern for rendering unintelligible an image displayed by said display device.

2. A display as claimed in claim 1, in which said first liquid crystal device comprises at least one linear polariser.

3. A display as claimed in claim 2, in which each said at least one liquid crystal layer comprises a nematic liquid crystal.

4. A display as claimed in claim 3, in which each said at least one liquid crystal layer is arranged to operate in one of untwisted nematic, twisted nematic, supertwisted nematic, vertically aligned nematic, twisted vertically aligned nematic and hybrid aligned nematic modes.

5. A display as claimed in claim 4, comprising first and second polarisers having transmission axes, said at least one liquid crystal layer comprising a vertically aligned nematic liquid crystal layer disposed between said first and second polarisers and having a liquid crystal director direction, when switched, whose azimuth is one of parallel and perpendicular to said transmission axes of said first and second polarisers.

6. A display as claimed in claim 2, in which said at least one liquid crystal layer is bistable.

7. A display as claimed in claim 6, in which said at least one liquid crystal layer is one of a bistable twisted nematic layer and a zenithal bistable nematic layer.

8. A display as claimed in of claim 2, in which said first liquid crystal device comprises a plurality of liquid crystal layers arranged to operate in a same mode.

9. A display as claimed in claim 8, in which said first liquid crystal device comprises first and second linear polarisers and said plurality of liquid crystal layers comprises first and second twisted nematic liquid crystal layers opposite twist directions disposed between said first and second linear polarisers.

10. A display as claimed in claim 9, in which said first liquid crystal device comprises a third linear polariser and said plurality of liquid crystal layer comprises third and fourth twisted nematic liquid crystal layers of opposite twist directions disposed between said second and third linear polarisers.

11. A display as claimed in claim 8, comprising first, second and third linear polarisers having polarising directions and first and second vertically aligned nematic liquid crystal layers, said first layer being disposed between said first and second polarisers, the second polariser having a polarising direction perpendicular to those of said first and third polarisers, and said first and second states being a pinwheel state and a uniform non-twisted state, respectively.

12. A display as claimed in claim 2, comprising first and second polarisers having transmission axes, said at least one liquid crystal layer comprising a non-twisted nematic layer disposed between said first and second polarisers and having an alignment direction whose azimuth is parallel to said transmission axes of the said first and second polarisers.

13. A display as claimed in claim 2, in which said first liquid crystal device comprises a fixed C plate retarder and said at least one liquid crystal layer comprises a switchable C plate retarder which is switchable between a first state, in which an optical effect of said fixed retarder is substantially nullified, and a second different state.

14. A display as claimed in claim 13, in which said switchable C plate retarder has substantially no optical effect in said second state.

15. A display as claimed in claim 13, in which said fixed retarder is a positive C plate retarder.

16. A display as claimed in claim 13, in which said at least one liquid crystal layer is cholesteric liquid crystal layer.

17. A display as claimed in claim 1, in which said first liquid crystal device comprises at least one electrode which is patterned with a first pattern.

18. A display as claimed in claim 17, in which said at least one electrode is patterned to define first and second regions of said at least one liquid crystal layer for providing first and second attenuations, respectively, of light travelling into said part of said first angular viewing range when said molecules are in said second state.

19. A display as claimed in claim 18, in which said first and second attenuations are minimum and maximum attenuations, respectively.

20. A display as claimed in claims 18, in which said second regions are inactive and are separated from first regions by a minimal insulating gap.

21. A display as claimed in claims 18, in which said first pattern is a pattern representing text.

22. A display as claimed in claim 18, in which said first pattern is a chequerboard pattern.

23. A display as claimed in claim 18, in which said first pattern is a pattern forming an optical illusion.

24. A display as claimed in claim 18, having a normal in which, when said molecules are in said second state, said first and second regions have a same function of transmission against angle with respect to said normal to said display for angles within said second viewing angle range and different fractions for angles inside said first viewing angle range and outside said second viewing angle range.

25. A display as claimed in claim 24, in which, when said molecules are in said second state, said electrodes defining said first and second regions are arranged to receive different voltages.

26. A display as claimed in claim 24, comprising a compensating layer cooperating with said at least one liquid crystal layer to provide said same function.

27. A display as claimed in claim 26, in which said compensating layer is arranged to be disabled when said molecules are in said first state.

28. A display as claimed in claim 27, in which said compensating layer comprises a liquid crystal.

29. A display as claimed in claim 28, in which said at least one liquid crystal layer comprises a surface mode layer having a surface region and said compensating layer comprises said surface region of said surface mode layer.

30. A display as claimed in claim 17, in which said first liquid crystal device comprises a further electrode which is patterned with a second pattern different from the first pattern.

31. A display as claimed in claim 30, in which said first and second patterns have different feature sizes.

32. A display as claimed in claim 17, in which said at least one patterned electrode comprises an addressable matrix for permitting selection of said obscuring pattern.

33. A display as claimed in claim 32, comprising an electrode driving arrangement for producing a time-varying obscuring pattern.

34. A display as claimed in claim 1, in which said at least one liquid crystal layer has a centre and edges and said electrode is arranged to apply a voltage to said at least one liquid crystal layer which varies from said centre to said edges of said at least one liquid crystal layer so as to compensate for off-normal viewing effects of said edges.

35. A display as claimed in claim 1, in which said first liquid crystal device is detachably attached to said display device to permit operation of said display without said first liquid crystal device.

36. A display as claimed in claim 1, in which said display has a normal and said second viewing angle range includes said normal to said display.

37. A display as claimed in claim 1, in which said second viewing angle range has a bisector which is non-normal to said display.

38. A display as claimed in claim 1, in which said second viewing angle range is rotationally symmetrical.

39. A display as claimed in claim 1, arranged to display an indication when said molecules are in said second state.

40. A display as claimed in claim 39, arranged to display said indication in response to a content of data for display.

41. A display as claimed in claim 1, in which said display device is transmissive.

42. A display device as claimed in claim 41, comprising a backlight and in which said first liquid crystal device is disposed between said display device and said backlight.

43. A display as claimed in claim 1, in which said display device is reflective.

44. A display as claimed in claim 1, in which said display device is transflective.

45. A display as claimed in of claim 1, in which said display device comprises a second liquid crystal device.

46. A display as claimed in claim 1, in which said display device is light-emissive.

47. A display as claimed in claim 46, in which said display device is an organic light emitting device.

48. A display as claimed in claim 46, comprising a circular polariser between said display device and said first liquid crystal device.

49. A display as claimed in claim 46, in which said display device is arranged to emit linearly polarised light.

50. A display as claimed in claim 1, in which said first liquid crystal device is disposed in front of said display device.

51. A display as claimed in claim 1 comprising an ambient light sensor for causing said display to provide said second viewing angle range when an ambient light is below a threshold.

52. A display as chimed in claim 1, wherein the display is a vehicle display.

* * * * *